US010528115B2

(12) United States Patent
Deng et al.

(10) Patent No.: US 10,528,115 B2
(45) Date of Patent: Jan. 7, 2020

(54) OBTAINING SMOOTHER POWER PROFILE AND IMPROVED PEAK-TIME THROUGHPUT IN DATACENTERS

(71) Applicant: Facebook, Inc., Menlo Park, CA (US)

(72) Inventors: Qingyuan Deng, Bellevue, WA (US); Chang-Hong Hsu, Ann Arbor, MI (US)

(73) Assignee: Facebook, Inc., Menlo Park, CA (US)

( * ) Notice: Subject to any disclaimer, the term of this patent is extended or adjusted under 35 U.S.C. 154(b) by 161 days.

(21) Appl. No.: 15/709,434

(22) Filed: Sep. 19, 2017

(65) Prior Publication Data

US 2019/0086981 A1 Mar. 21, 2019

(51) Int. Cl.
*G06F 1/00* (2006.01)
*G06F 1/324* (2019.01)
*G06F 1/3296* (2019.01)
*G06F 1/26* (2006.01)

(52) U.S. Cl.
CPC .............. *G06F 1/324* (2013.01); *G06F 1/266* (2013.01); *G06F 1/3296* (2013.01)

(58) Field of Classification Search
None
See application file for complete search history.

(56) References Cited

U.S. PATENT DOCUMENTS

| 8,566,627 | B2 | 10/2013 | Halepete et al. |
| 9,146,814 | B1 | 9/2015 | De et al. |
| 9,229,507 | B1 | 1/2016 | Hennecke et al. |
| 9,563,216 | B1 | 2/2017 | Barroso et al. |
| 2004/0163001 | A1 | 8/2004 | Bodas et al. |
| 2008/0301479 | A1 | 12/2008 | Wood et al. |
| 2010/0211810 | A1 | 8/2010 | Zacho et al. |
| 2016/0048185 | A1 | 2/2016 | Liang et al. |
| 2016/0050279 | A1* | 2/2016 | Pahng ..................... H04L 67/12 705/26.41 |
| 2017/0192488 | A1 | 7/2017 | Wu |
| 2017/0195408 | A1 | 7/2017 | Wu |

OTHER PUBLICATIONS

Advisory Action dated Jun. 30, 2017 for U.S. Appl. No. 14/458,677 by Liang, X., et al. filed Aug. 13, 2014.
Final Office Action dated Mar. 28, 2017 for U.S. Appl. No. 14/458,677 by Liang, X., et al. filed Aug. 13, 2014.
Non-Final Office Action dated Aug. 2, 2016 for U.S. Appl. No. 14/458,677 by Liang, X. et al., filed Aug. 13, 2014.

(Continued)

*Primary Examiner* — Nitin C Patel
(74) *Attorney, Agent, or Firm* — FisherBroyles, LLP

(57) ABSTRACT

Disclosed embodiments include a method performed by a computing device of a computer system having a hierarchical arrangement of power nodes including servers. The method includes determining power utilization patterns of the servers, calculating asynchrony scores for the servers based on the power utilization patterns, and clustering the servers into clusters based on the asynchrony scores, where each cluster has servers that have synchronous utilization patterns. The method also includes allocating the servers to the hierarchical arrangement of power nodes by selecting servers from the clusters to reduce synchronous power utilization patterns by the hierarchical arrangement of power nodes.

20 Claims, 15 Drawing Sheets

(56) References Cited

OTHER PUBLICATIONS

Non-Final Office Action dated Sep. 22, 2017 for U.S. Appl. No. 14/458,677 by Liang, X., et al. filed Aug. 13, 2014.
U.S. Appl. No. 14/458,677 by Liang, X., et al. filed Aug. 13, 2014.
U.S. Appl. No. 15/832,704 by Lin, K, et al., filed Dec. 5, 2017.
U.S. Appl. No. 15/257,310 by Wu, Q, et al., filed Sep. 6, 2016.
U.S. Appl. No. 15/262,986 by Wu, Q, et al., filed Sep. 12, 2016.

\* cited by examiner

OBTAINING SMOOTHER POWER PROFILE AND IMPROVED PEAK-TIME THROUGHPUT IN DATACENTERS

TECHNICAL FIELD

The disclosed teachings relate generally to power utilization optimization in datacenters. More particularly, the disclosed teachings relate to techniques for obtaining smoother power profiles and improved peak-time throughput by servers of datacenters.

BACKGROUND

Datacenters and their workloads are growing rapidly as cloud computing and Internet services become increasingly popular. A datacenter can have a hierarchical power delivery infrastructure including multiple levels to process highly fluctuating and diverse types of workloads. The workload capacity required to handle the ever-growing workload demands is constrained by a datacenter's power budget. Hence, power consumption is a major factor prohibiting the needed growth because existing datacenters cannot accommodate additional servers without surpassing the power capacity of its existing power infrastructure. The highly fluctuating data traffic and multi-level power infrastructures are two challenges that exacerbate the issues resulting from power limitations, significantly degrading the utilization efficiency of an available power budget.

Accordingly, the power capacity of a datacenter has become one of the most contended resources in datacenter management. Building additional datacenter facilities or new power infrastructures could help alleviate the stress on existing datacenters; however, doing so is costly and time-consuming. Thus, techniques that can efficiently utilize existing power infrastructures while maintaining satisfactory quality of service are needed.

DETAILED DESCRIPTION

Figure 1:
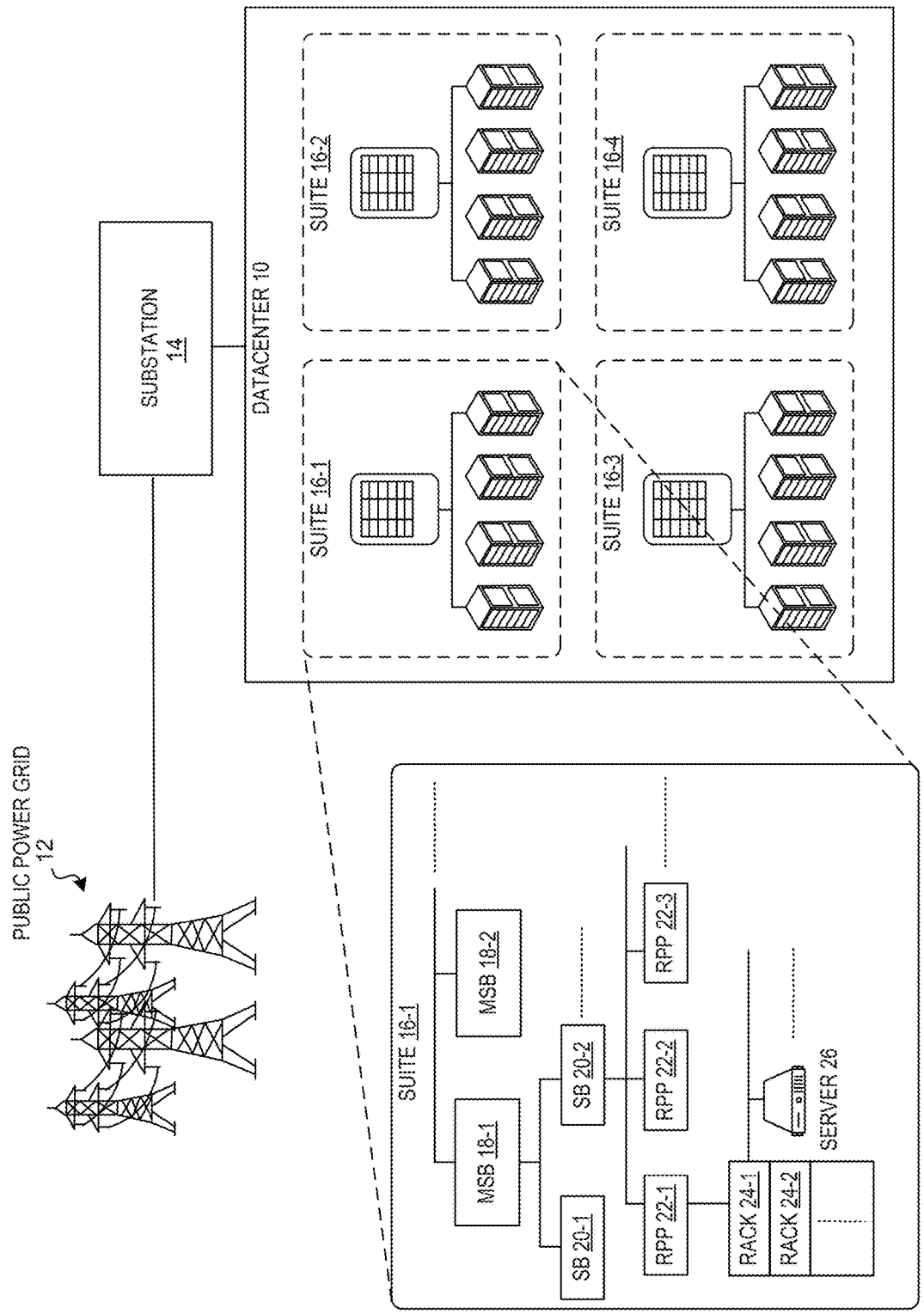
FIG. 1 is a block diagram illustrating a hierarchical multi-level power delivery infrastructure of a datacenter.

The embodiments set forth below represent the necessary information to enable those skilled in the art to practice the embodiments, and illustrate the best mode of practicing the embodiments. Upon reading the following description in light of the accompanying figures, those skilled in the art will understand the concepts of the disclosure and will recognize applications of these concepts that are not particularly addressed herein. It should be understood that these concepts and applications fall within the scope of the disclosure and the accompanying claims.

The purpose of terminology used here is only for describing embodiments and is not intended to limit the scope of the disclosure. Where context permits, words using the singular or plural form may also include the plural or singular form, respectively.

As used herein, unless specifically stated otherwise, terms such as "processing," "computing," "calculating," "determining," "displaying," "generating" or the like, refer to actions and processes of a computer or similar electronic computing device that manipulates and transforms data represented as physical (electronic) quantities within the computer's memory or registers into other data similarly represented as physical quantities within the computer's memory, registers, or other such storage medium, transmission, or display devices.

As used herein, the terms "connected," "coupled," or variants thereof, refer to any connection or coupling, either direct or indirect, between two or more elements. The coupling or connection between the elements can be physical, logical, or a combination thereof.

This disclosure relate to power utilization optimization in datacenters. Power management at the datacenter-level has gained increased attention because power is a significant limiting factor in datacenters. Solutions aim to manage peak power inside datacenters to achieve greater power efficiency. For example, solutions should smooth the power profile and improve peak-time throughput in datacenters. A power profile refers to the representative outline of power utilization by a resource over a period of time. For example, fluctuating data traffic can result in a greater difference between peak and valley values of power utilization. Ideally, a datacenter should have sufficient resources (e.g., servers) to handle fluctuating data traffic without surpassing the power capacity (e.g., budget) or underutilizing the resources of datacenters. Hence, a smoother power profile for datacenters is desired because an optimal number of resources could be identified and utilized.

Existing solutions focus on relatively small-scale power management problems at the server-level or small cluster-level. These existing solutions do not apply directly to datacenter-level problems and do not scale for datacenters because existing solutions ignore complex interaction between a relatively large number of servers serving diverse workloads or ignore multi-level power hierarchies of datacenters. In particular, existing solutions could degrade the performance of front-end services, which could impact critic user-facing datacenters. Other existing solutions include power routing and require changes to a power infrastructure, which is time consuming and costly. Yet other solutions require a complex job scheduler to dynamically schedule workloads to servers under different power nodes of a multi-level power infrastructure. While existing approaches may work for compute-intensive workloads, they could lead to an unbearable amount of data movement for data-intensive workloads such as HADOOP workloads.

The disclosed techniques overcome challenges of existing hierarchical power delivery systems in multiple production datacenters to serve increasing traffic without needing to change the power infrastructure. These challenges include (i) provisioning for peak power loads that leads to low power budget utilization and (ii) the use of a multi-level power delivery infrastructure that leads to power budget fragmentation.

A datacenter that includes different classes of servers consumes varying amounts of power at varying times. For example, front-end web servers may consume relatively large amounts of power during daytime hours when web traffic is heaviest and consume much less power at night when web traffic is lighter. Database servers, on the other hand, may consume more power at night when various batch data analysis and migration jobs are running compared to database jobs processed during the day. A datacenter is typically designed to accommodate peak-power utilization such that the peak-power approaches a maximum available power and could surpass the available power at some point.

The power budget fragmentation problem of datacenters refers to the situation caused by processing synchronous workloads on the same power node, leading to synchronous peak power utilization and thus low overall power utilization. This occurs because the number of servers that a power node can support depends on the peak power drawn by those servers. Thus, the power budget of that power node is underutilized when peak power is not being drawn, which could be most of the time.

Figure 4:
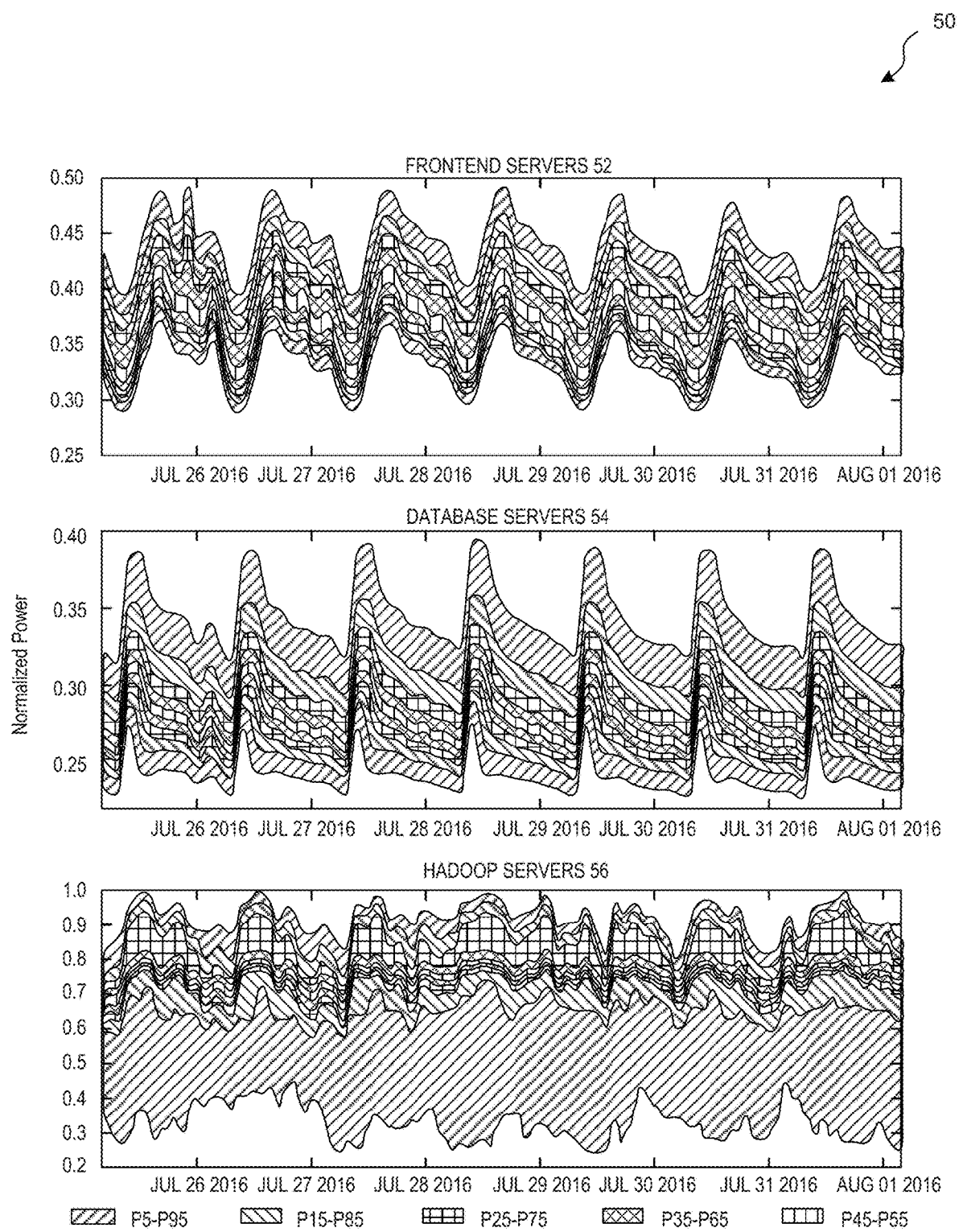
FIG. 4 illustrates diurnal patterns of difference classes of servers serving different workloads.

Provisioning for peak power loads leads to low power budget utilization. For large-scale datacenters that serve user-facing workloads, their total power utilization usually follows a diurnal pattern, which reflects highly fluctuating user activity levels throughout a day. For example, FIG. 4 illustrates diurnal patterns 50 of difference classes of servers serving different types of workloads. The upper graph 52 shows diurnal patterns of front-end servers, the middle graph 54 shows diurnal patterns of database servers, and the lower graph 56 shows diurnal patterns of HADOOP servers.

To ensure sustainability and safety, datacenter managers need to ensure that the peak loads of the aggregated power consumption is accommodated under the given, fixed power budget that the power infrastructure is able to supply. Existing solutions include priority-based power capping, which limits the power utilization of servers reactively when the aggregated power consumption at a power node is approaching its local power budget. That is, it forces a cap to "theoretically untouchable" high priority servers when all or most servers of a local power node are serving high-priority applications and their synchronous behaviors are causing local power hazards. However, this cannot be resolved by capping the low-priority servers under other power nodes. Power capping cannot solve the problem in production datacenters, largely due to power budget fragmentation resulting from the multi-level power delivery infrastructure.

FIG. 1 is a block diagram illustrating a hierarchical multi-level power delivery infrastructure of a datacenter 10. As shown, a public power grid 12 feeds power to a substation 14, which feeds power to the datacenter 10. The datacenter 10's power lines are divided to feed four into suites 16-1 through 16-4. A suite 16 has a combination of power nodes hierarchically arranged for power delivery at different levels including the power nodes. For example, the suite 16-1 has hierarchically arranged power nodes including main switchboards (MSBs) 18 connected to switchboards (SBs) 20 at a lower level. The SBs 20 are connected to remote power panels (RPPs) 22 at a lower level. The RPPs 22 are connected to racks 24 at a lower level, and each rack is connected to one or more servers 26.

The datacenter 10 has a (maximum) power capacity, as well as each power node of the hierarchical multi-level power delivery infrastructure. For example, if the power utilization exceeds the maximum available power capacity at any level of the hierarchy, a circuit breaker is tripped and all servers in that same level (or lower level) can lose power, e.g., after backup power also fails.

The hierarchical multi-level power delivery infrastructure of datacenters are susceptible to "power budget fragmentation." In particular, the datacenters tend to deploy a multi-level tree-like power delivery infrastructure shown in FIG. 1. The datacenters are designed by provisioning for peak power at each power node, without considering the characteristics of different types of workloads hosted by those power nodes. As a result, servers hosting the same type of workloads are often grouped under the same power node (e.g., a sub-tree) of the power infrastructure. In such a design, the servers under the same power node tend to have synchronous behaviors, which creates rapid, unbalanced peaks of power utilization with high amplitudes. The result is power budget fragmentation.

Existing datacenters aimed to solve power management challenges by provisioning for peak power, which actually leads to less efficient power budget utilization, is ineffective and can cause performance degradation, especially in datacenters that are partitioned for different types of workloads such as front-end services, database services, or HADOOP services.

Figure 2A:
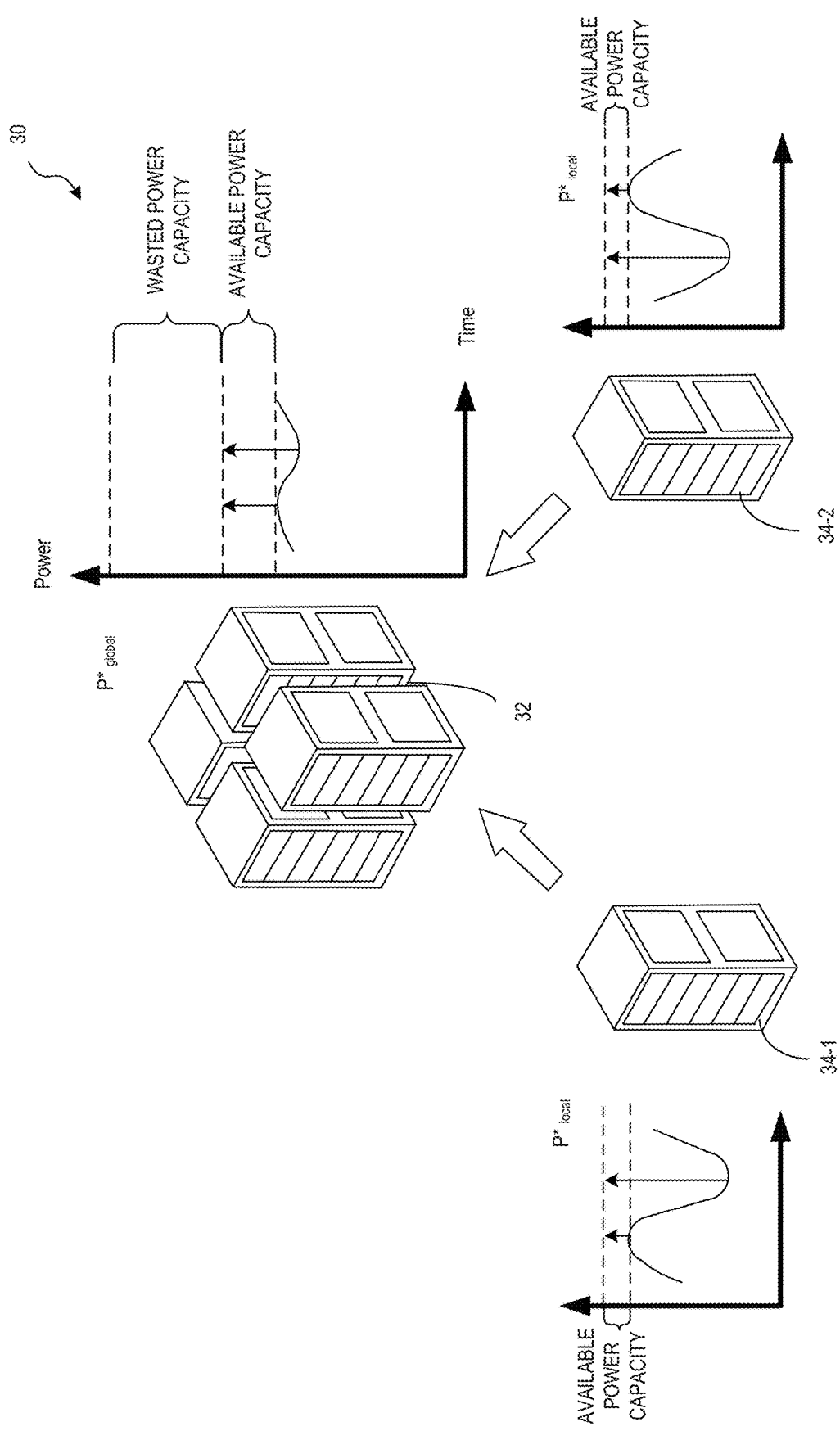
FIG. 2A is a block diagram illustrating a low efficiency power budget fragmented datacenter.

For example, FIG. 2A is a block diagram illustrating a low efficiency power budget fragmented datacenter 30. The datacenter 30 has a hierarchical multi-level power delivery infrastructure. To aid in understanding, the datacenter 30 is only illustrated as having two levels in the hierarchy. The root power node 32 at a higher level of the multi-level power infrastructure is connected to two leaf power nodes 34-1 and 34-2 at a lower level. Each of the leaf power nodes 34-1 and 34-2 has a fluctuating workload that causes fluctuating power utilization as illustrated in each of the adjacent local power profile ($P^*_{local}$). The resulting global power profile ($P^*_{global}$) reflects utilization by the root power node 32 as a sum of the power utilization by the leaf power nodes 34-1 and 34-2.

A datacenter is designed to accommodate fluctuating workloads of power nodes. For example, a given power node has a power budget greater than the known peak power for that node. The difference between the peak power of a node and the budgeted power for that node represents the available headroom. As illustrated, each local power profile has a headroom that surpasses peak power. The root power node has an available power budget equal to the sum of the headroom for each leaf power node, and a total power budget equal to the sum of the combination of each peak power and headroom for each leaf power node connected to the root power node.

Efficient utilization of a power capacity (also referred to as a power budget) of the root power node 32 depends on whether the fluctuating power utilization of the leaf power nodes 34-1 and 34-2 add constructively or destructively. For example, perfectly synchronous workloads of the power nodes 34-1 and 34-2 would add constructively to amplify peak power. In contrast, perfectly asynchronous workloads of the power nodes 34-1 and 34-2 would add destructively.

For example, the illustrated local power profiles of the power nodes 34-1 and 34-2 fluctuate out-of-phase such that they add destructively in the global power profile of the power node 32. This results in wasted power capacity meant to accommodate the power peaks of the local power profiles fluctuating in phase (e.g., adding constructively). This outcome is what is referred to as the power budget fragmentation problem.

The power budget fragmentation problem is common in multi-level powered datacenters, which results a significant amount of unused power capacity and prevents the growth of compute capacity because there is insufficient power headroom left for additional servers at leaf power nodes 34-1 and 34-2. While the power budget is sufficient at the higher level root power node 32, the local power peaks utilize available local power budgets rapidly at certain times and leave no room for additional servers at the lower level.

This disclosure introduces an effective solution to problems associated with relatively large-scale production datacenters. The disclosed techniques can leverage the underutilized power capacity locked-up due to the dynamic power capacity distribution of multi-level power delivery infrastructures of existing datacenters and, as a result, can achieve greater utilization efficiency without sacrificing performance of critical workloads. The disclosed techniques can handle diverse or competing workload demands of datacenters. For example, the underutilized power capacity of existing datacenters can be efficiently utilized to maintain the performance of front-end services and services for distributed storage and processing of big data (e.g., HADOOP services).

Figure 2B:
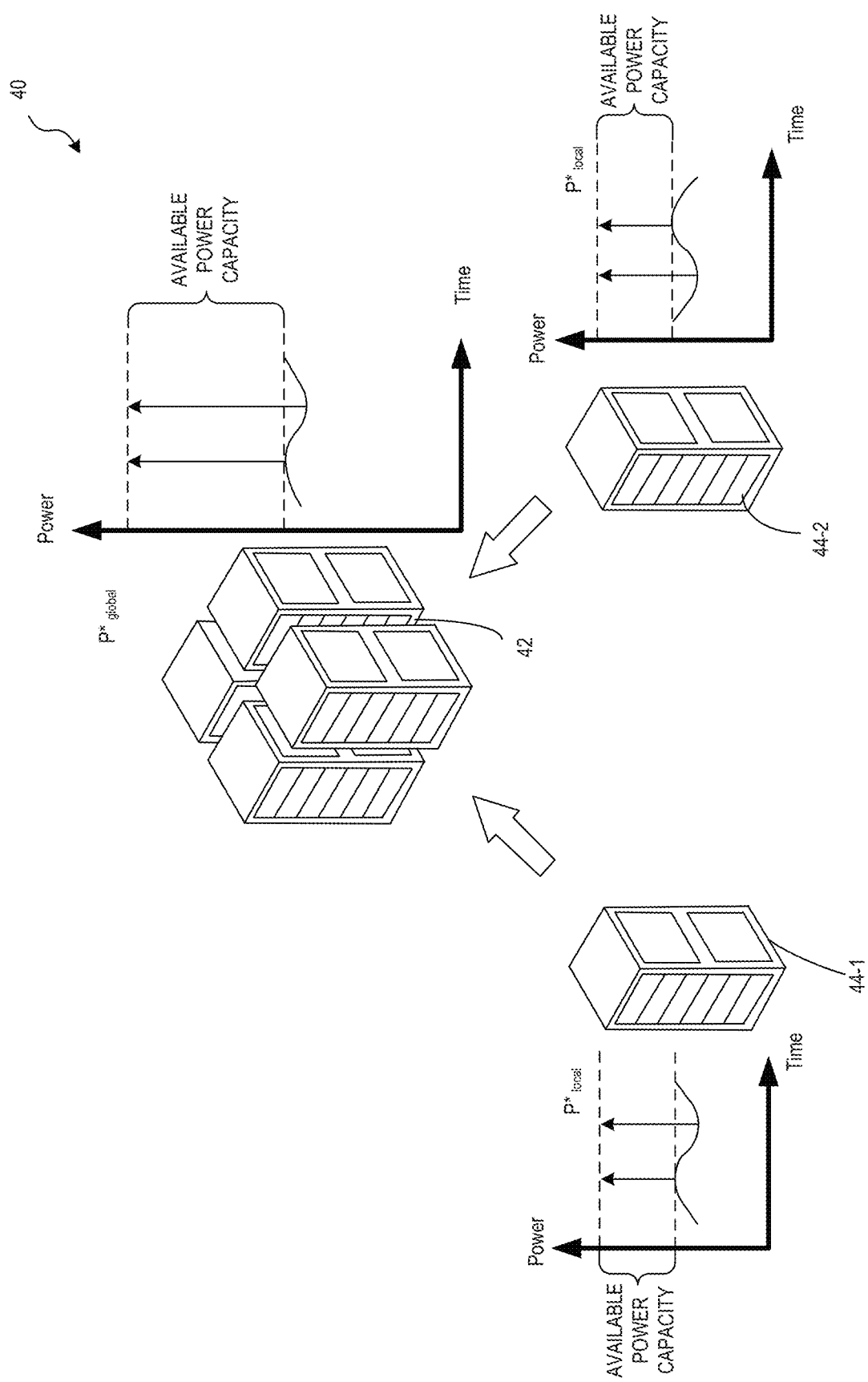
FIG. 2B is a block diagram illustrating an efficient lightly fragmented datacenter.

The disclosed techniques include predictive methods that allows for planning a performance and power impact on a datacenter system. For example, FIG. 2B is a block diagram illustrating an efficient lightly fragmented datacenter 40. The illustrated figure shows a root power node 42 coupled to two leaf power nodes 44-1 and 44-2 at a lower level of the multi-level power delivery infrastructure. Each leaf power node 44-1 and 44-2 processes a workload that fluctuates less than that of each leaf node 34-1 and 34-2 of FIG. 2A. As such, each leaf power node 44-1 and 44-2 had greater headroom and the resulting available global power budget of the root power node 42 is greater compared to the root power node 32 of FIG. 2A. Disclosed herein is a technique for achieving the improvement of FIG. 2B, as well as other techniques for alternatively or additionally improving power utilization in a datacenter.

There are at least two techniques disclosed herein for improving power utilization in datacenters. In one technique, certain types of server are allocated using a server assignment algorithm so that peak power utilization does not exceed available power capacity at any power node or level of the multilevel power delivery infrastructure. The assignment algorithm can compute an asynchrony score metric based on measured historical power consumption values, apply a K-means clustering algorithm to group servers into clusters of highly synchronous servers, and allocate servers from the clusters to form highly asynchronous power nodes. This technique is referred to as a process of a workload-aware server placement framework.

In another technique, certain types of servers can be temporarily reset to process certain workloads and/or their CPU power utilization can be dynamically adjusted. Examples of the functionality than enables this dynamic adjustment are described in U.S. patent application Ser. No. 15/257,310, titled "DYNAMICALLY ADAPTING TO DEMAND FOR SERVER COMPUTING RESOURCES," filed on Sep. 6, 2016, and U.S. patent application Ser. No. 15/262,986, titled "DYNAMICALLY ADAPTING TO DEMAND FOR SERVER COMPUTING RESOURCES," filed on Sep. 6, 2016, and which are hereby incorporated by reference herein in their entireties. For example, a web server can be reset as a database server at night and a database server can be reset as a web server during the day. This technique is referred to as dynamic power profile reshaping at runtime. These two techniques, alone or in combination, can smoothen a power utilization profile and reduce peak power utilization by datacenters.

The power utilization patterns of production workloads can be leveraged to distribute synchronous workloads of servers uniformly in accordance with a workload-aware server placement framework, which greatly mitigates power budget fragmentation. To aid in understanding, this disclosure generally describes a server as serving a particular type of workload (e.g., front-end, back-end, database). For example, as server serving front-end services is classified as a "front-end server." A server could serve multiple types of workloads at the same or different points in time. Further still, a node including a server cluster could serve the same or different types of workloads at the same or different times.

For example, as described further below, the workload-aware server placement framework includes an asynchronous placement policy based on power utilization patterns to distribute synchronous workloads of servers such that they are not all in the same power node. That is, since the number of servers that a power node can support depends on peak power that could be drawn by different types of workloads, placing servers serving the same type of workloads together in the same power node can lead to synchronous peak power utilization and thus low overall power utilization. The disclosed workload-aware server placement framework avoids these drawbacks.

The workload-aware server placement framework frees up significant amount of wasted power capacity at higher-level power nodes. A key insight leading to the disclosed solution is that when applications do not reach the peak power usage at the same time, the aggregated power profile is smoother under the low-level power nodes and the power utilization would be significantly improved. To this end, the disclosed techniques can compute the placement policy based on a clustering and analysis of the asynchronous nature of each workload's power trace.

The dynamic power profile reshaping at runtime technique could further improve on the workload-aware server placement framework. The dynamic power profile reshaping at runtime technique uses dynamic voltage frequency scaling (DVFS), which is a power management technique where the clock frequency of a processor is decreased to allow a corresponding reduction in the supply voltage. The dynamic power profile reshaping at runtime technique can also use workload-type conversion to convert a server (e.g., storage-disaggregated servers) from serving a first workload type (e.g., front-end services) to serving a second workload type (e.g., HADOOP services) for a period of time and in a manner that improves overall power utilization. To aid in understanding, the disclosure refers to the non-limiting example of a "front-end/HADOOP conversion" for converting a disaggregated server from serving front-end services to serving HADOOP services, and vice versa. This technique can improve off-peak-hour power budget utilization efficiency as described further below. This further improves the utilization efficiency of a datacenter's power budget and achieves significant throughput improvement without changing the underlying power delivery infrastructure.

The power utilization by existing datacenters can be meaningfully improved by implementing the disclosed techniques. For example, the disclosed workload-aware server placement framework can restore up to 20% or more of wasted power budget across the entire hierarchy of the power delivery infrastructure in the production environment without needing to change the underlying power delivery infrastructure. The dynamic power reshaping at runtime additionally or independently improves utilization efficiency of a datacenter's power budget, reducing the level of underutilization by more than 40% or more without needing to change the underlying power infrastructure. Further, energy slack reduction could be improved by 44% or more and front-end throughput could be improved by up to 8% or more of without negatively impacting the overall throughput of HADOOP clusters of an existing datacenter.

Thus, the disclosed techniques can mitigate power budget fragmentation in large-scale datacenters equipped with a multi-level power delivery infrastructure and exploit power headroom for optimizing overall power budget utilization and improve service throughput. To aid in understanding these techniques, non-limiting representative datacenters are described along with the power data and performance data of production machines (e.g., servers) in these datacenters.

Power Budget Fragmentation

The hierarchical multi-level power delivery infrastructure is commonly deployed in a large-scale production datacenter. At each level, the total power capacity of a power node is shared among its child nodes. This type of tree-like multi-level power infrastructure is designed to avoid a single point of failure and for the convenience of management.

Referring back to FIG. 1, the illustrated datacenter 10 features a four-level power infrastructure, consistent with the OPEN COMPUTE PROJECT specification. As shown, servers 26 are placed onto rows of racks 24, allocated into four rooms, which are called suites 16. A suite is equipped with multiple first-level power devices, i.e., the main switching boards (MSBs) 18, each of which supplies second-level power devices, switching boards (SBs) 20, which further feed to a set of third-level reactive power panels (RPPs) 22. Finally, the power is fed into fourth-level racks 24, on which tens of servers 26 may be mounted. The power capacity of each root power node (e.g., suite 16) is approximately the sum of the budgets of its child power nodes (e.g., servers 26). In some cases, a root power node may be provisioned a slightly greater power budget than necessary for its collective child power nodes to improve utilization.

The multi-level nature of the power delivery infrastructure is a cause of power budget fragmentation and underutilization of a datacenter's power budget. As described above, power budget fragmentation exists when servers that are grouped together under the same sub-tree of the multi-level power infrastructure are serving workloads with synchronous power utilization patterns. The synchronous servers peak at the same time and therefore create a rapid, unbalanced peak with high amplitude, which rapidly utilizes the power capacity of the supplying power node. When the peak power load of the aggregated power of a sub-tree under a power node exceeds the power capacity of that power node, after some relatively short amount of time, a circuit breaker is tripped and the power supply to the entire sub-tree is shutdown. These local power limits, therefore, make it challenging to efficiently utilize the total power budget that is supplied to a datacenter.

Figure 3A:
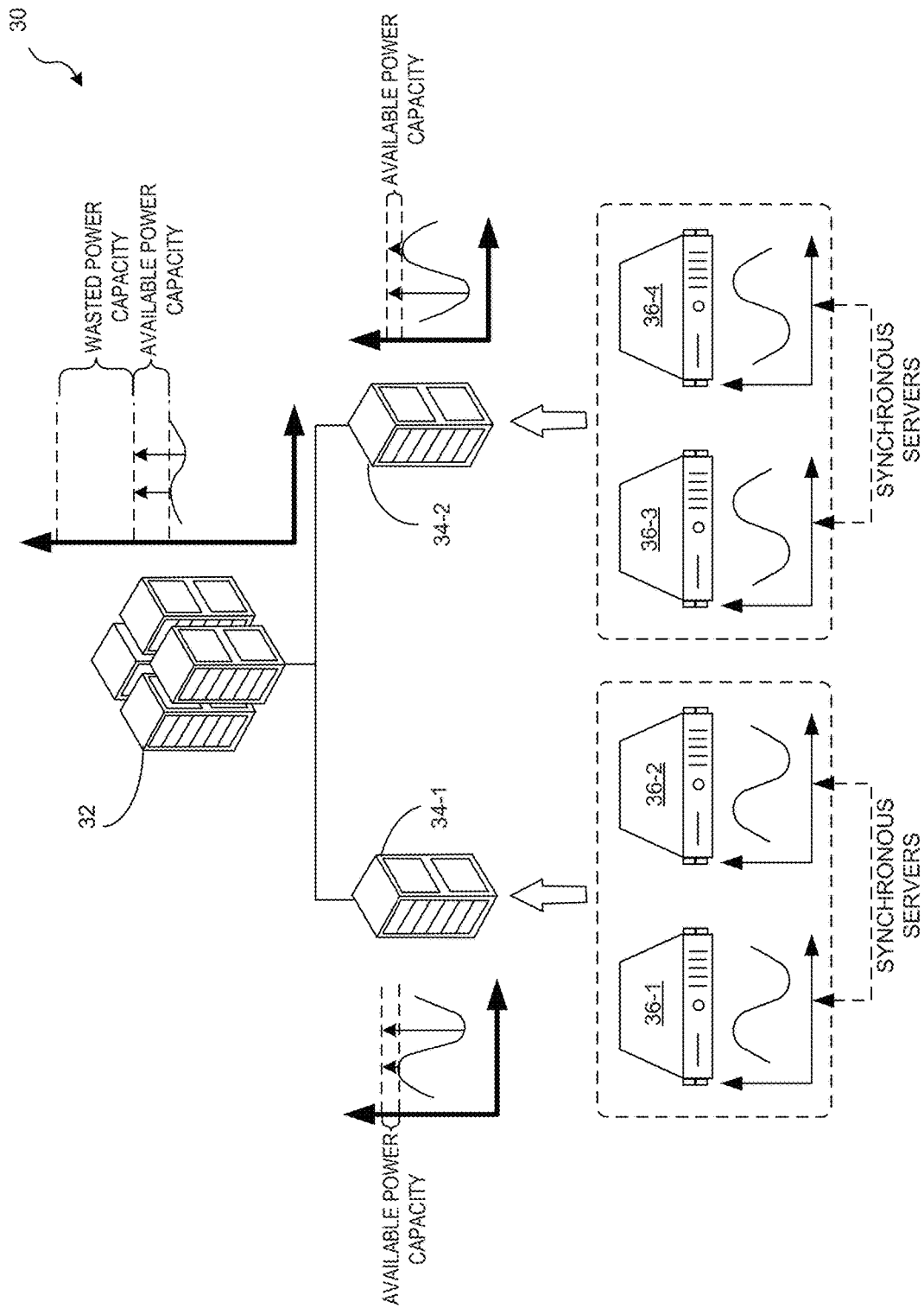
FIG. 3A is a block diagram illustrating the low efficiency power budget fragmented datacenter of FIG. 2A including synchronous servers.

For example, FIG. 3A is a block diagram illustrating the low efficiency power budget fragmented datacenter of FIG. 2A including synchronous servers that cause power budget fragmentation. As shown, the simplified datacenter 30 has a 2-level power infrastructure including a root power node 32 at a first-level that is connected to two leaf power nodes 34-1 and 34-2 at a second-level. Each second-level power node 34-1 and 34-2 has two servers 36-1 and 36-2 and 36-3 and 36-4, respectively, with fluctuating local power utilization as shown in their adjacent power profiles. That is, the servers 36 are clustered or grouped under leaf power nodes 34. To aid in understanding, the server 36-1 and the server 36-2 have identical power behavior. That is, the power traces of the two servers 36-1 and 36-2 are synchronous and their amplitudes are identical. Further, the server 36-3 and the server 36-4 have identical power traces, which have basically the same shape compared to those of servers 36-1 and 36-2 but perfectly out-of-phase.

FIG. 3A illustrates poor placement of the servers 36 from the same synchronous groups that are placed under the same sub-trees of the power nodes 34. This placement creates high peaks in both of the leaf power node 34-1 and 34-2, although at different times for different leaf power nodes, and leaves almost no power headroom at the leaf level. This prohibits the leaf power nodes 34 from supplying power to additional servers and results in a relatively large amount of global power budget that is wasted as described above with reference to FIG. 2A.

Figure 3B:
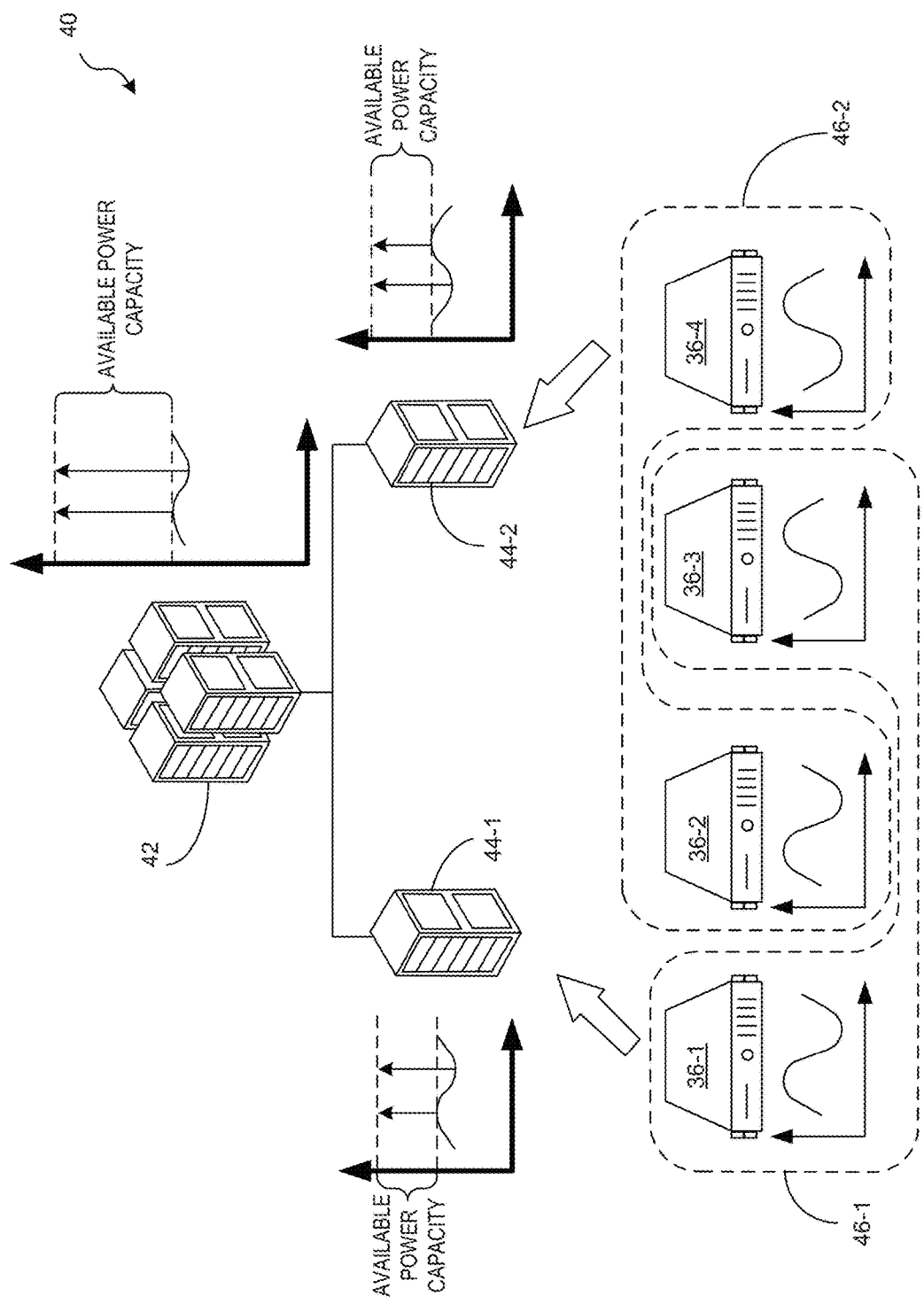
FIG. 3B is a block diagram illustrating an implementation of a workload aware server placement framework on the datacenter of FIG. 2A to obtain the lightly fragmented datacenter of FIG. 2B.

The utilization of power capacity can be improved by implementing the workload-aware placement framework introduced above. For example, FIG. 3B is a block diagram illustrating an implementation of the workload aware server placement framework to obtain a relatively lighter power fragmented datacenter 40 compared to datacenter 30 from FIG. 3A. As shown, the server 36-2 and the server 36-3 are swapped, which results in much better server placement because this "unlocks" the wasted headroom of a datacenter. As illustrated, the total power budget and the total aggregated power traces of these two different placements are exactly the same at the root power node.

The disclosed techniques can use metrics to quantify the power budget fragmentation of a datacenter and inefficiencies of power budget utilization. For example, two metrics include (i) total peak power of child power nodes and (ii) average power slack.

The total peak power of child power nodes of a root power node is a metric that operates as indicator of power budget fragmentation. For the same aggregated power profile, it is optimal to distribute the power evenly to the child power nodes. If any child power node shares less work at the peak time, this means that other child power nodes need to take a greater workload to compensate because the total amount of workload at that point in time is unchanged. This increases the difference between the peak and the valley power values of the other children's power traces, which leads to a greater likelihood that the higher peak of the other children's power traces are capped by the local power budget.

The power slack metric is a measurement of wasted power budget at a particular point of time, and is defined as $$P_{slack,t} = \frac{P_{budget} - P_{instant,t}}{P_{budget}}$$

where $P_{instant,t}$ is the instant power utilization of a power node at time t, and $P_{budget}$ is a constant value representing a given power budget of the power node. The average power slack is the mean value of the power slack $P_{slack,t}$ over a timespan T. The power budget being utilized is directly proportional to the average power slack. Hence, the greater the average power slack, the greater proportion of the power budget that being utilized on average. These two metrics can be used to guide the development of solutions and measure the quality of results.

Peak Heterogeneity in Datacenters

As mentioned above, datacenters often handle a wide spectrum of services. Even in highly web-centric systems such as social media systems, to support a variety of data-centric features and high visitor rate, a significant proportion of servers in production datacenters are provisioned to serve a variety of types of internal workloads.

Figure 5:
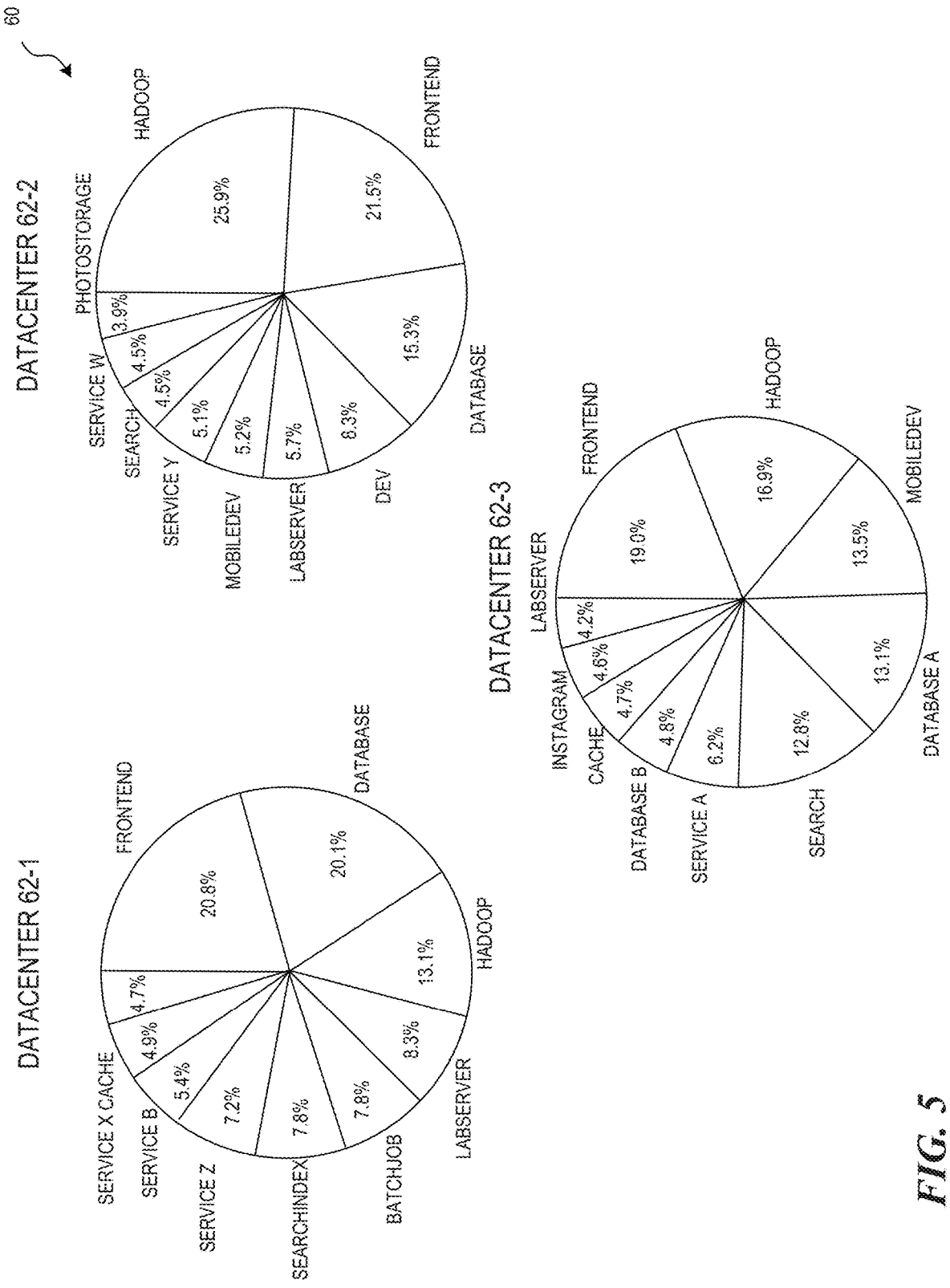
FIG. 5 illustrates examples of average power consumption for different types of workloads by difference classes of servers at different datacenters.

For example, FIG. 5 illustrates examples of average power consumption for different types of workloads at different datacenters 62-1, 62-2, and 62-3. The power usage patterns are heterogeneous across workloads. This heterogeneity allows for abundant opportunities to mitigate power budget fragmentation by grouping complementary workloads under the same power node.

Referring back to FIG. 4, the graphs show diurnal patterns of three classes of workloads 50 served by respective server clusters at a datacenter. The classes include front-end workload servers 52, database workload servers 54, and HADOOP workload servers 56. Each graph 52, 54, and 56 indicates the percentiles of the workload by relative shading.

The front-end clusters serve traffic directly from users to the production website. The front-end clusters may include web and cache servers, could be a major part of a social medial datacenter, and constitute a class of clusters that can consumer a relatively large portion of a datacenter's power budget. Because of their user-facing nature, the servers in these clusters have highly synchronous power patterns, which follow the typical user activity level. The latency requirement for this type of workload strict because it directly affects user experience. Therefore, these servers are usually running in turbo mode and their workloads may be prioritized over other classes of workloads when contending for the same power resource. Examples of the turbo mode functionality are described in the aforementioned U.S. patent application Ser. No. 15/257,310.

The database clusters are the back-end of the front-end web and cache cluster and also serves part of user queries. One aspect that makes database servers different from front-end servers is that a query only reaches a database server when the data required to satisfy a query is missing in cache servers. Compared to front-end servers, database servers are more I/O bound. These servers run at a lower CPU frequency and utilization even during peak hours, and therefore have lower power consumption during the day. At night, on the other hand, database servers need to perform daily backups, which includes performing data compression and, therefore, peak the CPU. As FIG. 4 illustrates, while the database servers 54 have predictable diurnal pattern, their peaks are asynchronous with the front-end servers 52.

The HADOOP clusters 56 serve batch jobs that aim to improve the quality of data that are needed by a website or a company. Since users do not directly interact with this class of server, their services are not bound by a latency requirement; instead, they aim at providing the greatest throughput possible. To achieve satisfactory throughput, the execution of this class of job greatly relies on a job scheduler's policy, and a HADOOP server almost always runs at greater settings of CPU frequencies. Consequently, as illustrated in FIG. 4, the power consumptions of HADOOP servers 56 are constantly relatively high and less impacted by the amount of user activity.

Workload-Aware Server Placement Framework

The disclosed workload-aware server placement technique takes advantage of the peak heterogeneity identified among the production workloads described above and mitigates power budget fragmentation by intelligently grouping asynchronous servers.

Figure 6:
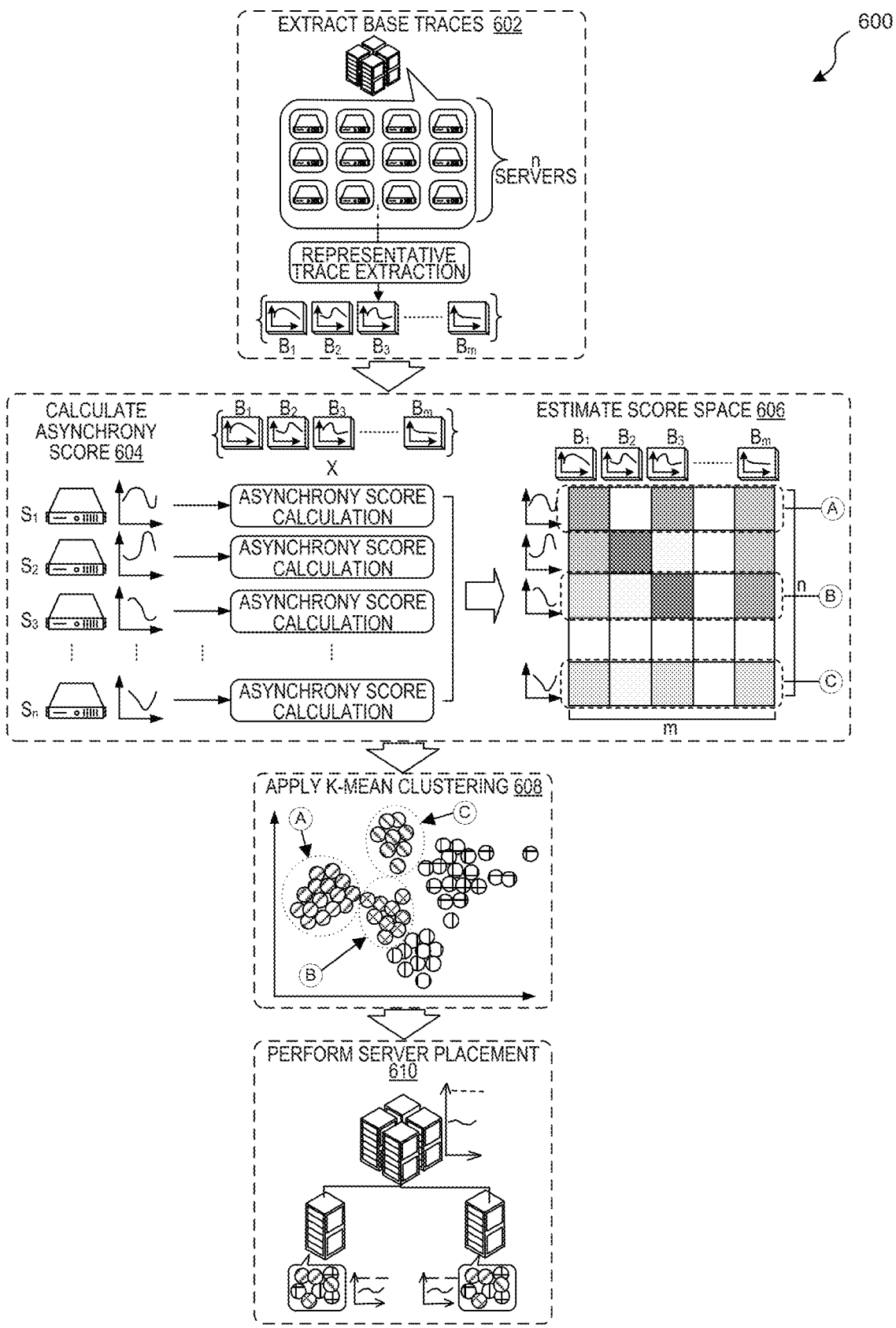
FIG. 6 is a flow diagram illustrating a process of a workload-aware server placement framework to address power budget fragmentation in a multi-level power delivery infrastructure.

FIG. 6 is a flow diagram illustrating a process 600 for a workload-aware server placement framework that can mitigate power budget fragmentation in a multilevel power delivery infrastructure. In this example, there are |S| servers that are to be placed in a target datacenter in accordance with the workload-aware server placement framework. In step 602, a set of |B| base traces are extracted from n servers of a power node of the multilevel power delivery infrastructure. As shown, a total of m base traces are extracted from the n servers. A "base trace" refers to a power utilization profile extracted by measuring power utilization by one or more nodes (e.g., servers) over a period of time. In some instances, the base traces may represent the "most significant power patterns" of relatively large amounts of servers grouped together. The m base traces could be extracted over the same particular period of time to facilitate comparing power utilization between servers. For example, base traces may be extracted from servers over a period of multiple weeks immediately before the current time.

In step 604, an asynchrony score (A) is calculated for each server against each server of the m base traces. The asynchrony score is a metric that takes advantage of aforementioned peak heterogeneity. This metric is defined to measure how sparse the peaks of the power traces of these servers spread out across time. When a new server is added to a group of servers, this metric also measures the impact to the aggregated peak. For example, the asynchrony score may be defined as:

$$A = \frac{\Sigma_{j \in S_N} v_j}{\hat{p}}$$

where $S_N$ is the set of servers provisioned for the power node N, $v_j$ is the value of the peak power of the power trace of server j, and $\hat{P}$ is the peak power draw of the aggregated power trace of all the servers in $S_N$. The numerator is the "sum-of-max" among all the power traces being considered, and the denominator is the "max-of-sum" power draw of the servers in $S_N$.

A lower asynchrony score corresponds to greater overlap of the peaks of the component power traces, and therefore sets how "worse" the group is. The lowest possible value of asynchrony score is 1.0, meaning that every power trace peaks at the same time. The highest possible value of asynchrony score is $n_N$, which is the number of servers of the power node N. This indicates that the component power trace peaks are perfectly spread out and the peak of the aggregated power trace is the same as that of any of the component power traces.

The workload-aware server placement framework involves iteratively calculating the asynchrony scores to derive a layout of servers that result in an even placement of the servers under the power nodes, which maximizes power headroom and mitigates fragmentation at the power nodes.

FIG. 3B illustrate the impact of the workload-aware server placement framework on the aggregate peak power of the power node in FIG. 3A. In other words, FIG. 3B illustrates the impact of the asynchrony scores when applied to the power node of FIG. 3A. Referring to FIGS. 3A and 3B, from the highest-level power node perspective 12 and 22, respectively, the asynchrony score of any placement that involves these four servers 16-1 through 16-4 are the same for both of the two placements, since the servers 16-1's through 16-4's power traces are unchanged. At local power nodes 14, with the poor placement, the asynchrony score of either local nodes 14 is 2.0. However, by exchanging servers 16-2 and server 16-3, the asynchrony score is closer to 1.0 for both power nodes 26-1 and 26-2. The low asynchrony score in FIG. 3B indicates that the fragmentation has been mitigated.

Referring back to extracting base traces in step 602, the asynchrony score of each server can then calculated against these "representative behaviors" observed in the target datacenter. In some embodiments, the base traces are extracted by calculating an average power trace for each top power-hungry services (e.g., HADOOP, Web, Cache, etc.). The average power traces represent the most significant power patterns when a large amount of servers are placed together, which implies that the times the peaks of these base traces occur is highly likely to be the time when the actual peaks happen.

The power traces can be further averaged over a lengthy timespan, such as a multiple week timespan, to avoid over-fitting to some anomalous peaks that might be caused by unusual sudden traffic. The coarser server-to-base trace granularity may be used over calculating server-to-server asynchrony scores because (1) the pair-wise server-to-server asynchrony score calculation could take an unreasonable amount of time because there could be numerous servers (e.g., tens of thousands) in a datacenter. Also, after embedding in the next step, a server-to-server asynchrony score matrix will lead to a very sparse, high-dimensional space (>$10^4$), which may not be ideal for clustering in subsequent steps, and (2) the resulting asynchrony score calculation might over-fit the decision to the power traces of individual servers because, for a single server, its power trace could vary significantly from week to week.

In step 606, the asynchrony scores are used to estimate the impact on the aggregated peak when multiple servers are grouped together. The servers are associated with asynchrony scores and are represented as respective data points in a high-dimensional space. As shown, an m×n high-dimensional asynchrony score space is estimated based on the asynchrony scores.

The asynchrony score space can be used to classify and place servers based on their asynchrony. For example, suppose B is the set of top representative services, the base traces |B| are extracted. For each server, a single asynchrony score is computed against each of the base traces. Then each server is embedded as a data point in a |B|-dimension asynchrony score space. In some embodiments, the servers are embedded into an |S|-dimension asynchrony score space.

Figure 7:
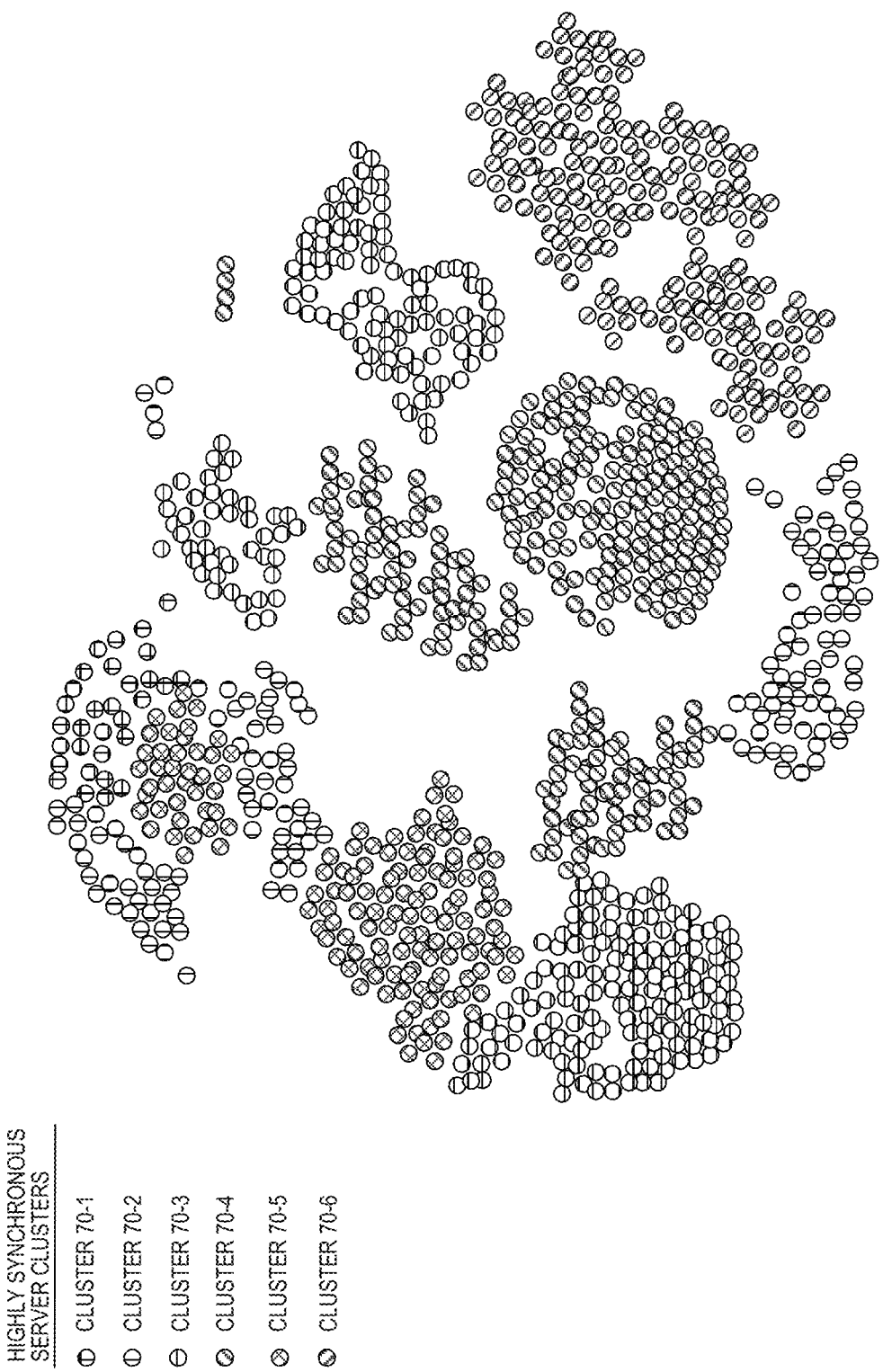
FIG. 7 illustrates application of a K-mean clustering technique to separate servers into clusters of highly synchronous servers.

In step 608, the servers of the asynchrony score space are groups into different clusters that have relatively similar power utilization profiles. That is, a clustering technique is applied on the data points of the asynchrony score space to separate asynchronous servers into different clusters. For example, K-mean clustering technique could be applied to the data points to classify the servers into highly synchronous groups. For example, FIG. 7 illustrates an application of K-mean clustering to seven separate clusters 70-1 through 70-6 of highly synchronous servers.

Referring back to FIG. 6, in step 610, a server placement policy is applied to the server clusters 70-1 through 706. For example, the placement policy may aim to minimize the asynchrony score of each power node by assigning servers to the power nodes in a top-down manner. This approach aims to mitigate uneven, rapid peaks, and extract maximum utilization of the power budget throughout the entire hierarchy of the multilevel power deliver infrastructure.

Specifically, servers are allocated from the top-level of the power delivery infrastructure. Assuming p is the number of the power nodes in a current level, a p-mean clustering is applied to classify the servers into p clusters. Servers are then selected from each of clusters in a round-robin fashion and allocated to the p power nodes.

For example, assuming a set of servers |S| are to be placed into the target datacenter. Starting from the top-level L and allocating servers to p lower-level nodes, the first step is to extract the set of |B| base traces out of these servers. For each server, one asynchrony score is calculated against each base trace, and |B| asynchrony scores are calculated for each server in the end. This allows for embedding each server as a data point into the |B|-dimensional space defined by the asynchrony scores. Then, the p-mean policy is applied on the asynchrony space to obtain a set of p-clusters denoted as $C=\{c_1, c_1, c_2, c_3 \ldots c_p\}$.

For each lower-level power node, the algorithm iterates through all the clusters, and assign $$\frac{c_i}{p}$$

servers from cluster i to that power node, and so on, until all the servers are assigned to the lower-level power nodes. The process repeats and terminates when all the servers are assigned to the lowest-level power nodes.

The workload-aware server placement framework provides benefits from the perspective of power safety in a datacenter by reducing power variations at local power nodes. For example, in the optimized placement, servers that have highly synchronous behaviors are distributed uniformly across all the power nodes. When sudden traffic burst arrives, all the power nodes share the load change caused by the sudden extra traffic. Such load sharing leads to a lower probability of high peaks aggregates at a small subset of power nodes, and therefore decreases the likelihood of tripping circuit breakers of power nodes.

Dynamic Power Profile Reshaping at Runtime

The workload-aware server placement framework may not aim to improve global power budget utilization, but its effect on local power nodes unlocks a significant amount of global power budget that is otherwise wasted. Recognizing the opportunity to utilize this extra power headroom, the disclosure includes techniques for reshaping dynamic power profiles at runtime to proactively and dynamically enforce the reshaped power profiles for services at particular times. The "shape" of a power profile refers to the curve representing a measure of power utilization as a function of time.

The dynamic power profile reshaping can involve two components. The first component is dynamic voltage frequency scaling (DVFS)-based power profile reshaping that can dynamically shape the power consumption for different services at different times of the day and proactively shape their power profiles. The effectiveness of DVFS-based reshaping is constrained by a server's configuration and hardware resources limits. However, the second component is to apply front-end/HADOOP (F/H) conversion to one or more additional compute-storage disaggregated servers that can utilize the power headroom in accordance with their converted state at different times of the day on compute nodes. The use of a combination of these two components can improve the power budget utilization and front-end throughput during peak hours.

The dynamic power profile reshaping may include one or more policies that are trained on data that spans a period of time in recent history (e.g., a few weeks back). The recent history is used for training policies because the traffic of datacenter services can be highly dynamic due to frequent datacenter management actions such as the addition or decommission of servers or the temporary shutdown of servers under maintenance. Hence, using recent power utilization data for training policies can prevent reshaping power profiles from being too incompatible with current demands because the policies were trained on data associated with a time where the demand was different. The policies can also be retrained on demand or periodically to keep the policies up-to-date.

The dynamic power profile reshaping can have enable phases and boundaries between the phases. A phase may refer to a period where a particular workload type is processed by particular servers. For example, a decision engine can cause servers to operate in two phases: a front-end heavy phase and a HADOOP-heavy phase. In the front end heavy phase ("peak phase"), a power budget of servers is near being completely utilized. The decision engine favors front-end tasks to ensure that any extra traffic can be digested without interfering with existing traffic. In the HADOOP-heavy phase ("off-peak phase"), the decision engine can exploit the underutilized power budget by allocating a larger proportion for the HADOOP servers to increase overall HADOOP throughput.

Figure 8:
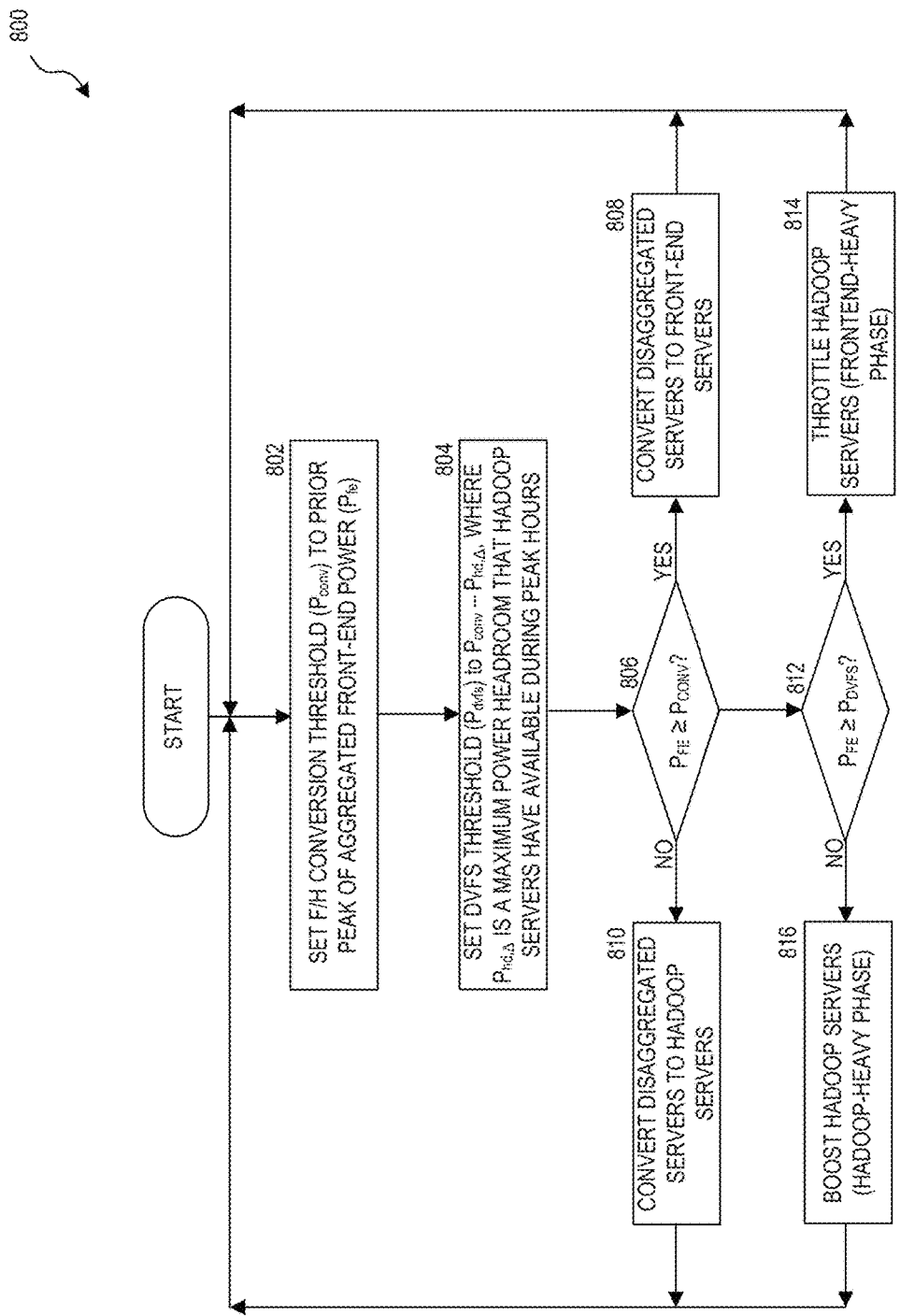
FIG. 8 is a flowchart illustrating a method for dynamic power profile reshaping at runtime.

FIG. 8 is a flowchart illustrating a method 800 for dynamic power profile reshaping at runtime. The boundary between phases can be set based on thresholds associated with the total power consumption of the front-end servers ($P_{fe}$) at a current time. The thresholds include an F/H conversion threshold ($\overline{P}_{conv}$) and a DVFS threshold ($\overline{P}_{dvfs}$). The $\overline{P}_{conv}$ value represents the power level at which a decision engine should trigger desegregated servers to convert between front-end and HADOOP states. The $\overline{P}_{dvfs}$ value represents the power level at which the decision engine should trigger HADOOP servers to change between boosting and throttling configurations.

In step 802, $\overline{P}_{conv}$ is set to the peak of aggregated front-end power identified from historical data. $\overline{P}_{conv}$ is set to this value because $P_{fe} \geq \overline{P}_{conv}$ indicates that front-end servers are experiencing a load exceeding any value previously experienced. Thus, a need exists for servers that can handle the additional load. Accordingly, desegregated servers are converted to front-end servers in order to serve the additional load and to prevent quality of service (QoS) degradation.

In step 804, $\overline{P}_{dvfs}$ is set to $\overline{P}_{conv} - \overline{P}_{hd,\Delta}$, where $\overline{P}_{hd,\Delta}$ is a maximum power headroom that HADOOP servers have available during peak hours. Hence, the threshold for causing HADOOP servers to change between boosting and throttling can be set to the F/H conversion threshold minus the headroom of the HADOOP servers. $P_{fe} \geq \overline{P}_{dvfs}$ indicates that a datacenter is in a front-end heavy phase, otherwise the datacenter is a HADOOP-heavy phase and the decision engine can cause the HADOOP servers to run at relatively higher configurations.

In operation, the reshaping decisions are made by a reshaping engine that compares power readings of a current time (e.g., having a current timestamp) to historical power readings (e.g., having older timestamps) and makes a reshaping decision for a subsequent time (e.g., a next timestamp).

In step 806, the reshaping engine determines whether $P_{fe} \geq \overline{P}_{conv}$ which indicates that front-end servers are experiencing a load exceeding any value previously experienced. If true, the disaggregated servers are converted to front-end servers in step 808. The conversion process may include pausing an executing process and resuming another process. Hence, the latency is longer than DVFS. To prevent frequent context switching, a the disclosed embodiments can include a policy that prevents a server from converting within a period of time after a prior conversion (e.g., 20 min). If $P_{fe} < \overline{P}_{conv}$, the disaggregated servers could be converted to HADOOP servers in step 810.

In step 812, the reshaping engine determines whether $P_{fe} \geq \overline{P}_{dvfs}$. If true, the HADOOP servers throttle their configurations in response to the recently observed trend of the $P_{fe}$ value in step 814. If $P_{fe} < \overline{P}_{dvfs}$, a decision is made to boost all HADOOP servers to run at a highest sustainable turbo mode in step 816. Thus, the $\overline{P}_{dvfs}$ value is used to trigger switching HADOOP servers' DVFS decision to change between boosting and throttling configurations. The method 800 iterates through the aforementioned steps to operate dynamically at runtime.

The F/H conversion of disaggregated servers solves many problems. For example, although reshaping HADOOP servers with DVFS clears out the headroom that is made available for serving extra front-end traffic, front-end servers are typically already configured for the highest possible throughput to ensure QoS. As such, the front-end servers cannot be configuration for more computing capacity. Hence, a datacenter cannot serve increasing front-end traffic (e.g., queries) without affecting QoS due to constraints an existing set of front-end servers. As such, there is a need for extra front-end servers during front-end heavy phases.

Similar issues occur with HADOOP servers, which may be configured to always run at a highest non-turbo mode frequency. While turbo mode can be turned on to improve computing power, it cannot compensate for throughput loss due to the throttling on these machines during front-end heavy phases. As such, there is a need for extra HADOOP servers only during batch-heavy phases.

A solution to these challenges is to simply use extra dedicated front-end and/or HADOOP servers that can be switched on/off dynamically when needed depending on the phase of the day. This arrangement can waste resources because either group of extra servers will stay off for a long period of time. Moreover, the latency caused by switching servers on/off is relatively large and power glitches are unpredictable (e.g., any runtime deployed to monitor or cap the system is not effective before the OS is booted). Moreover, switching a server on/off often could damage its disk and shorten its lifetime.

Another solution is the use of disaggregated servers. In particular, this class of server has a storage node and a compute node that is disaggregated. Instead of adding extra dedicated front-end and HADOOP servers, the power headroom is utilized by these disaggregated servers, which are converted for handling HADOOP or front-end services when meeting or exceeding the aforementioned thresholds. As such, even during a front-end heavy phase, data needed by a HADOOP workload remains intact and accessible because the HADOOP workload is handled by dedicated storage nodes. Also, when crossing between conversion phases, the compute nodes only need to pause and resume processes, which is relatively fast (e.g., within seconds) and the servers are still controllable by other runtime monitors (e.g., for emergency purposes).

Embodiments include a policy that takes advantage of the highly predictable diurnal pattern of the front-end traffic and makes boosting, throttling, and conversion decisions based on the instant aggregated power reading of front-end servers and a current timestamp. As such, it may be critical to validate the policy by determining whether the particular decisions to boost, throttle, and convert servers is optimal, and detect any deviation from usual operations.

Embodiments allow for precisely predicting a peak time of front-end workload. However, the amplitude of power waves varies from time-to-time by a potentially large difference. To ensure that the policy can make correct decisions they are made based on a current power situation rather than relying on historical power readings. For example, a most recent window of observations can be continuously monitored and Welch's unequal variances t-test can be applied to detect any deviation of a current power trace from the preset policy. The deviation detected during the last window is then added to or deducted from the decision made for a next timestamp (depending on whether the deviation is a surplus or a slack).

For example, at time t, Welch's t-test can be performed on the observation window and the history window with 95% confidence interval. If the test result satisfies the null hypothesis (i.e., the two windows have an equal mean), a decision made for time t+1 will not be adjusted. If the test result invalidates the null hypothesis, the decision for t+1 will be shifted by the difference between the average of the two windows.

Examples

In one example, power traces are extracted with multiple weeks of power readings measured on all servers of the three production datacenters 62-1, 62-2, and 62-3. Each of the datacenters have four suites, and tens of thousands of servers. The datacenters are supplied power by a multi-level power delivery infrastructure.

A performance power model is created for any HADOOP servers. The model is created by machine measurements on a local machine. To obtain such a model, a set of Hive benchmarks is run, which consists of 65 Hive queries on a 12-core SandyBridge machine with 144GB RAM and 1TB disk space. A complete run is launched at each available frequency step of the core, and the runtime and power consumption of the CPU is measured with an INTEL POWER GADGET. The throughput is then calculated by taking the inverse of the runtime.

Figure 9:
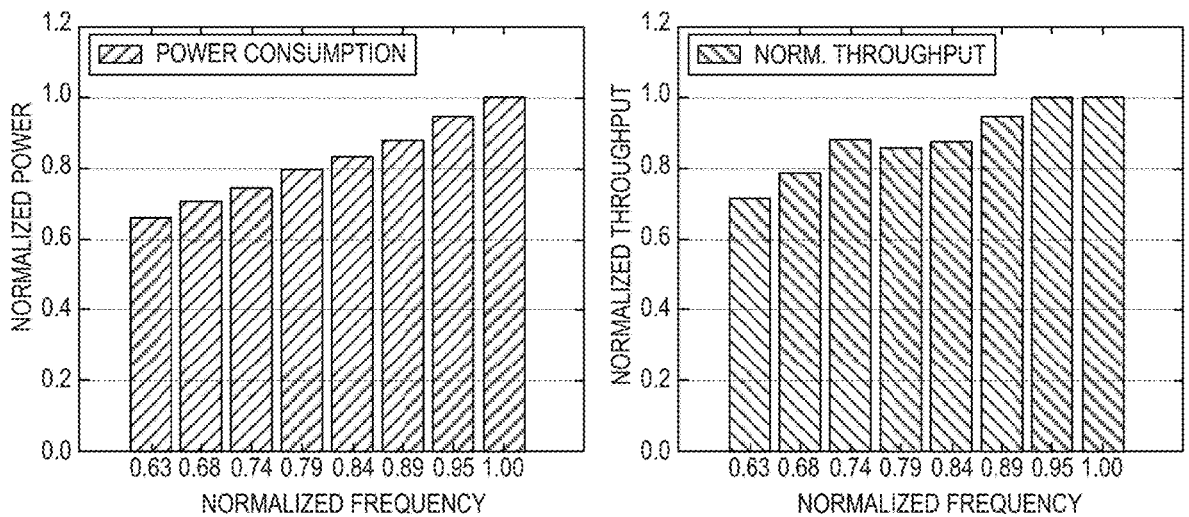
FIG. 9 includes graphs illustrating machine measurements of performance power tradeoff under a multiple core frequency.

FIG. 9 illustrates machine measurements of performance power tradeoff under a multiple core frequency. Both the power consumption and throughput have a linear relationship with processor frequency. For example, as the frequency drops to 63%, both the power consumption and the throughput drop to about 65% to 70%.

The workload-aware server placement framework can achieve significant peak power reduction which mitigates power budget fragmentation at different levels of the power infrastructure. A reduction in power variation also results from the optimized placement. In addition, with proactive power profile reshaping, power slack is significantly reduced, especially during off-peak hours and better utilizes a given power budget.

Figure 10:
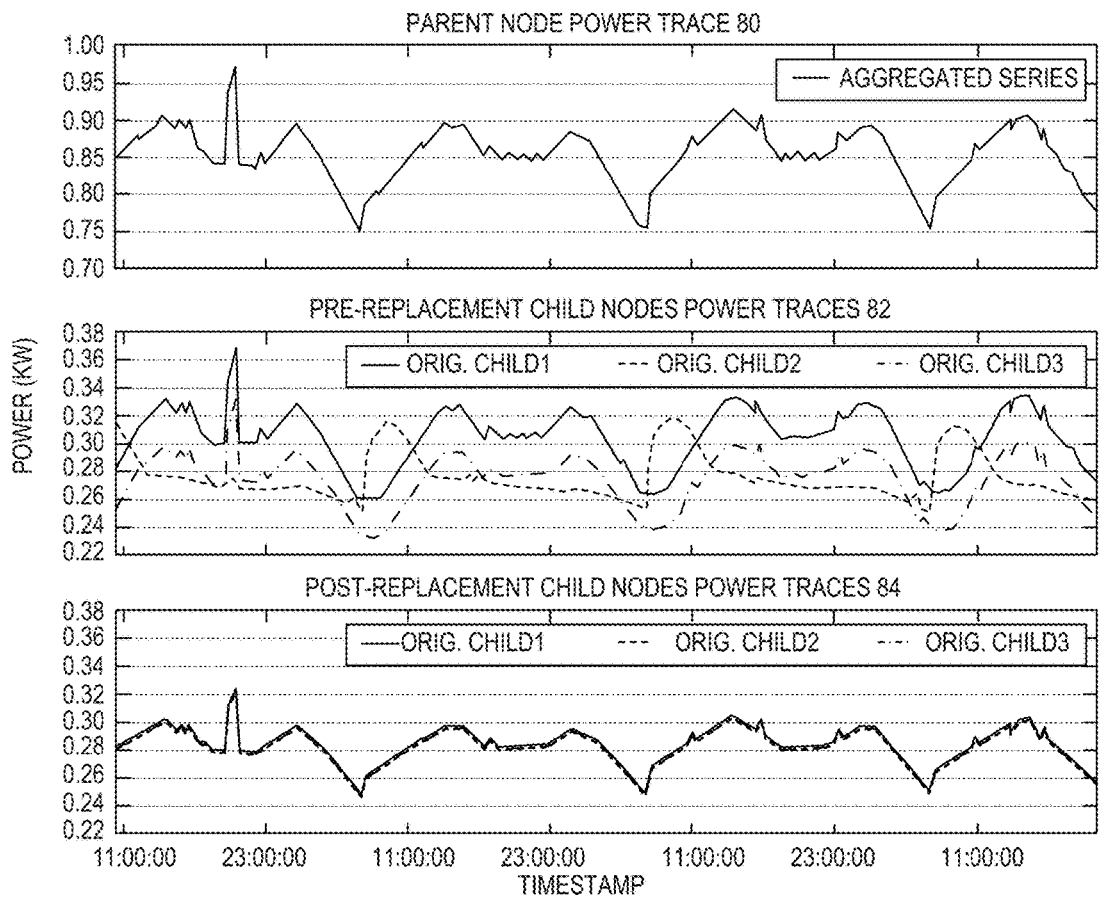
FIG. 10 includes graphs illustrating a comparison between child power traces generated by arbitrarily placed servers and workload-aware placed servers.

FIG. 10 includes graphs illustrating a comparison between child power traces generated by arbitrary placement and workload-aware placement of servers. The uppermost graph 80 shows the aggregated power trace of a parent power node. The middle graph 82 shows child power traces in accordance with an arbitrary placement policy. The low graph 84 shows implementation of a workload-aware placement framework on servers. The aggregated power trace does not change because the placement policy does not move servers out of a sub-tree rooted at a parent node. However, the child power traces are flatter and a reduced peak power is achieved at the level of the child node by implementing the workload-aware placement framework.

Figure 11:
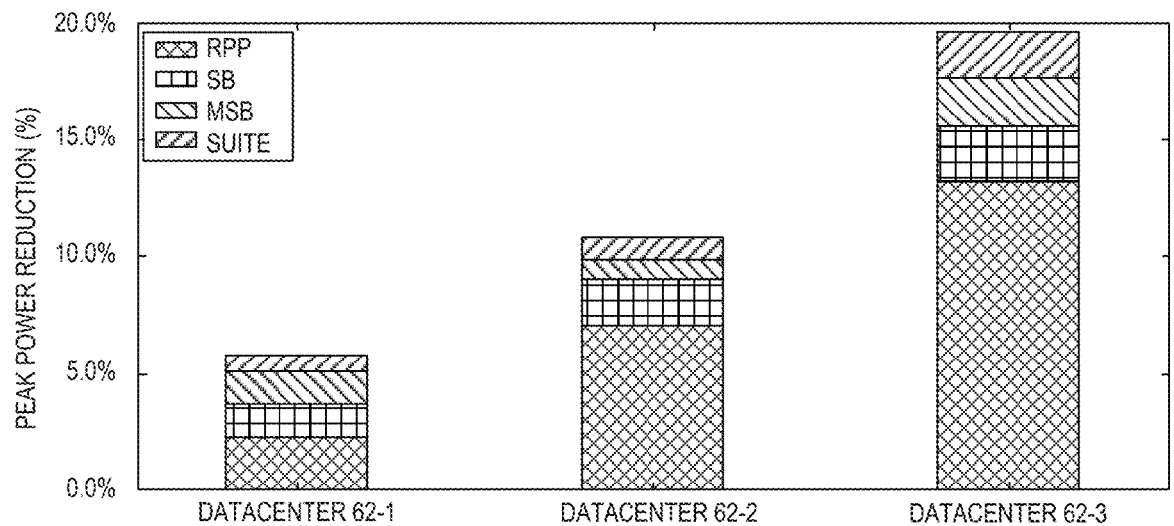
FIG. 11 is a graph illustrating an example of peak-power reduction achieved at each level of the power delivery infrastructure in three datacenters.

The effectiveness of the workload-aware server placement framework on peak power reduction at all levels in all three datacenters 62-1, 62-2, and 62-3 is further quantified in FIG. 11. Note that, as described in previous sections, since servers can be freely moved within a datacenter but not across different datacenters, the set of servers in any datacenter remains unchanged before and after changing their placement. Therefore, the datacenter-level peak power reduction is zero.

The lowest power levels of the hierarchical multi-level power delivery infrastructure (i.e., at the RPP-levels) is where power budget fragmentation stems because there is more unbalanced placement of servers at these levels. As shown in FIG. 11, the workload-aware server placement framework can reduce peak power for 2.3%, 7.1% and 13.1% at the RPP-level for the datacenters 62-1, 62-2, and 62-3, respectively. The lower-level peak power reductions represent the amount of power headroom that is restored for the higher-level from power budget fragmentation, which directly corresponds to the proportion of extra servers that are housed under the same power delivery infrastructure.

In addition, additional available headroom can be obtained from the original placement and therefore can achieve 0.65%-2.4% of extra headroom improvement at each higher level in all three datacenters. The total adds up to 5.7%, 10.8%, and 19.5% peak power reduction for the datacenters 62-1, 62-2, and 62-3, respectively, across levels.

The results may vary from one datacenter to another. For example, although significant power headroom in the datacenter 62-3 can be extracted, the benefit achieved in the datacenter 62-1 may be smaller. This explains the server placements in the datacenter 62-1 suites are more balanced in the sense that the servers under any lowest-level power node tend to not peak at the same time. For the datacenter 62-3, on the other hand, with the existing placement, synchronous servers tend to be grouped under the same RPPs and therefore the workload-aware placement framework achieves significant improvement on the datacenter 62-3.

As previously discussed, the workload-aware server placement framework improves the power safety at each level of a power delivery infrastructure. The power variation can be conducted for each level of the underlying power infrastructure in the the datacenters 62-1, 62-2, and 62-3. Two server placement arrangements are implemented for each datacenter. The first is an arbitrary placement that is employed in the production datacenters and the second is the workload-aware placement framework. A moving time window W of window length L on the power trace of each power node is used and a maximum power variation is calculated within this window. Then, the window is applied to discover amounts of power variation distributions for the two placements.

Figure 12:
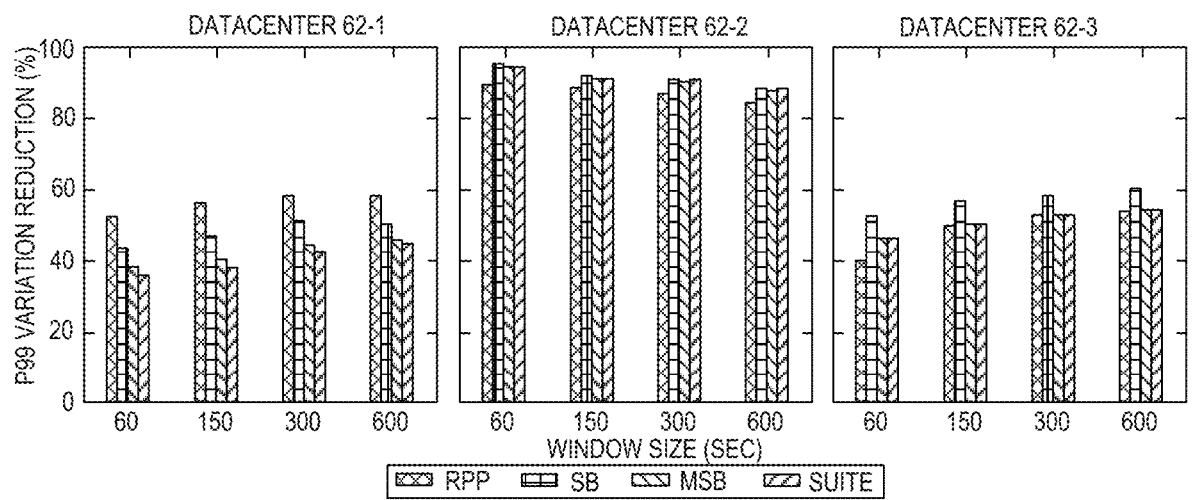
FIG. 12 includes graphs illustrating examples of reduction of 99th-percentile short-term power variation at each level of three datacenters after implementing the workload-aware server placement framework.

FIG. 12 illustrates examples of reduction of the 99th-percentile short-term power variation at each level of the three datacenters after implementing the workload-aware server placement framework. As shown, the workload-aware server placement framework can achieve about 40%, 90%, and 50% reduction on the 99th-percentile (p99) power variation in the datacenters 62-1, 62-2, and 62-3, respectively. There is no significant different between the variation reductions among different window sizes in all the three datacenters. Also, except for the datacenter 62-1, the difference in variation reduction among different levels is also small. As shown, the power variation can be improved at all the levels if servers are placed intelligently, and can greatly reduce the likelihood of circuit breakers being tripped by sudden changes in current draw.

The dynamic power profile reshaping improves utilization efficiency of global power budget. The dynamic power profile reshaping can be applied to selected datacenters. To test the effect, a comparison before and after reshaping power traces of an example datacenter is made, together with the change in the distribution of the aggregated power readings of this datacenter over a one-week timespan. The benefit of this technique on the datacenter can be shown quantitatively, to efficiently utilize a power budget to handle a greater workload more efficiently even during off-peak hours even when the global power budget is unchanged.

Figure 13:
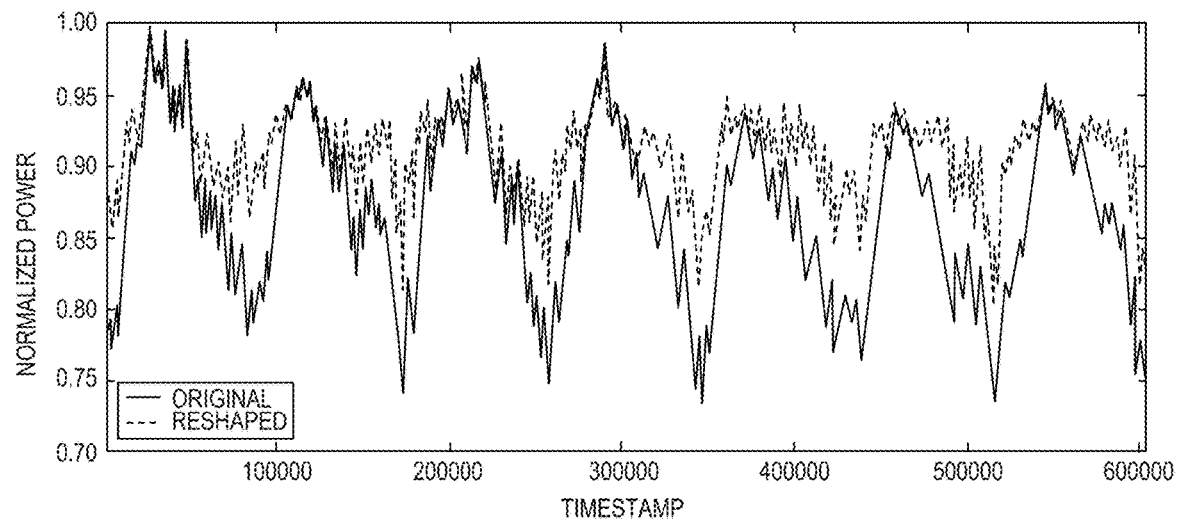
FIG. 13 is a graph illustrating a comparison between an aggregated original power trace and a reshaped power trace of a datacenter.

As indicated above, the power profile reshaping can proactively increase computing power of HADOOP servers during off-peak hours to improve the power budget utilization and compensate throughput loss of HADOOP servers by providing ways to allow higher front-end server power budget during the peak hours. For example, FIG. 13 illustrates a comparison between an aggregated original power trace and a reshaped power trace of a datacenter. Again, the dynamic power profile reshaping involves making decisions based on recognizing datacenter phases of a day and historical readings of power consumption, which may be highly predictable. As shown in FIG. 13, a 7-day highest-level power trace of a datacenter is shown. While the peaks of the two curves are similar, the reshaped power traces are more flattened compared to their original shape. This means that the difference between peak power and valley power is much smaller and therefore the datacenter is able to better utilize a power budget to achieve better overall performance.

During off-peak hours, dynamic power profile reshaping recognizes that a power budget is underutilized and that the level of front-end traffic allows the front-end clusters to run without requiring more power; therefore, it allocates a much larger power budget to HADOOP clusters. This boosts the performance of the HADOOP clusters during the off-peak hours without affecting the QoS of front-end services. This results in a smoother aggregated power trace. Although there may be some valleys in the power trace, this is due to the fact that the traffic is so low that even the combined boosting effect of the converted HADOOP server and the DVFS of the existing HADOOP servers is not enough to entirely fill up the gap.

Figure 14:
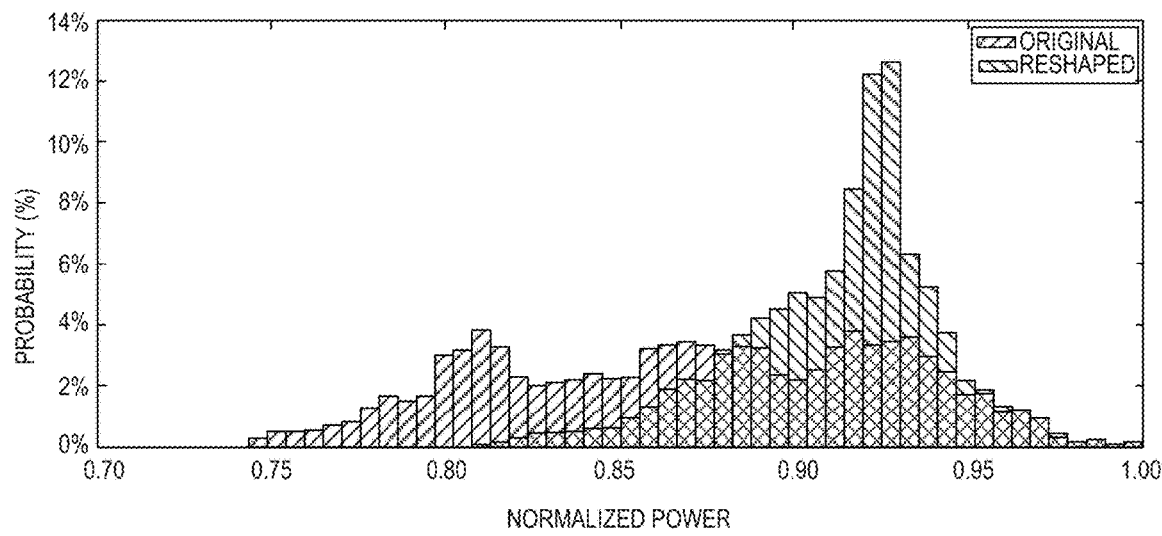
FIG. 14 is a graph illustrating a probability density function (pdf) of a week of power readings sampled in a datacenter for an original power trace and a reshaped power trace.

FIG. 14 illustrates a probability density function (pdf) of a week of power readings sampled in a datacenter for an original power trace and a reshaped power trace In particular, FIG. 14 shows that a power reading distribution is much tighter and has shifted rightward toward the global power budget post reshaping, which indicates a much reduced energy slack and a much more efficient use of the global power budget.

Figure 15:
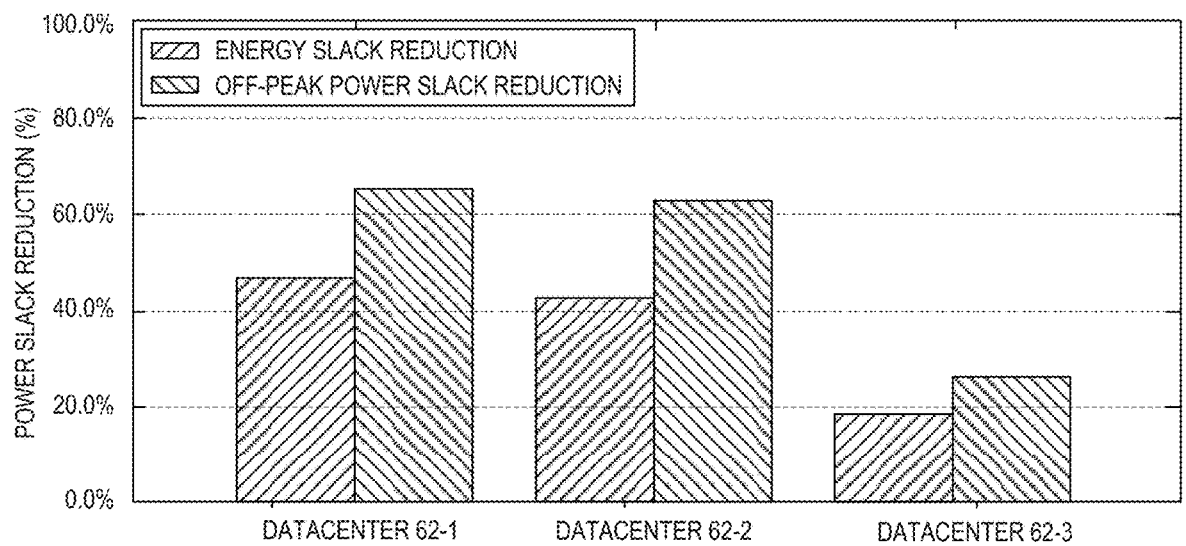
FIG. 15 is a graph illustrating an energy slack and off-peak hour power slack reduction achieved at three different datacenters.

FIG. 15 illustrates an energy slack and off-peak hour power slack reduction achieved at the three different datacenters. Quantitatively, the dynamic power profile reshaping of the illustrated example achieves 44%, 41%, and 18% energy slack reduction in the datacenters 62-1, 62-2, and 62-3, respectively. The three datacenters can benefit from the more efficient use of a power budget and process more traffic of both front-end and HADOOP workloads under the same power budget.

Figure 16:
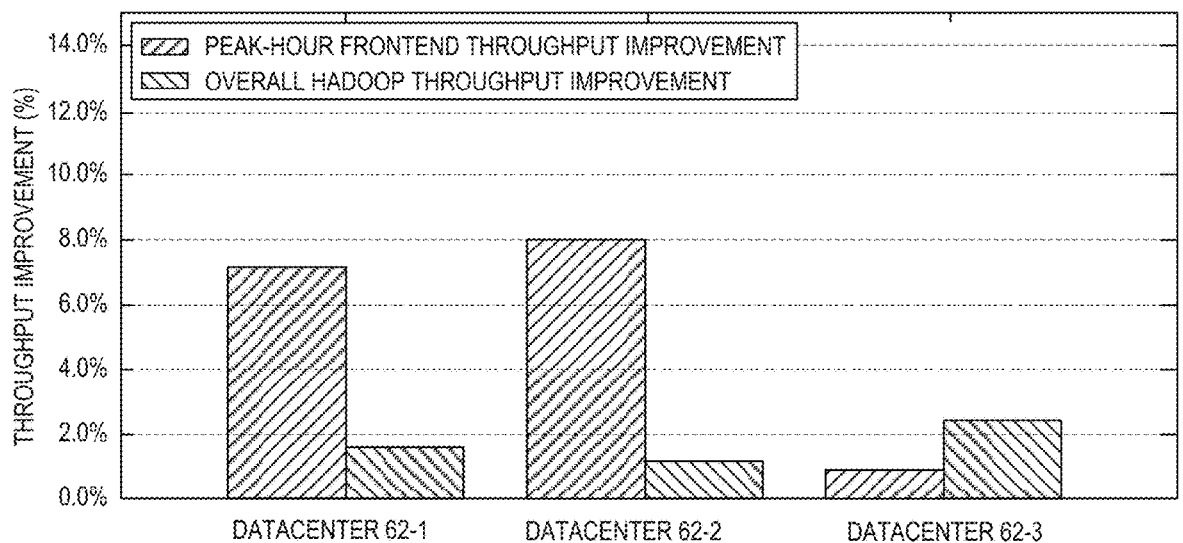
FIG. 16 is a graph illustrating throughput improvement by front-end servers and HADOOP servers.

FIG. 16 is a graph illustrating throughput improvement of front-end and HADOOP workloads. FIG. 16 shows the performance impacts of power profile reshaping on the front-end clusters and the HADOOP clusters in the three datacenters. As expected, while the reshaping basically maintains the overall HADOOP throughput or even provides a slight improvement (1.8%, 1.3%, and 2.2%, respectively), the capacity of the front-end service is largely improved in 2 of the 3 datacenters during the peak hours, which is the only period of time where some datacenters need extra computing power. With the original global power budget unchanged, reshaping does not cause any degradation to the performance of Hadoop services, and the improvement of peak-time front-end throughput is 7.2%, 8%, and 1.8% for the datacenters 62-1, 62-2, and 62-3, respectively, which translates to a capacity gain that accommodates multi-millions extra queries per second.

Figure 17:
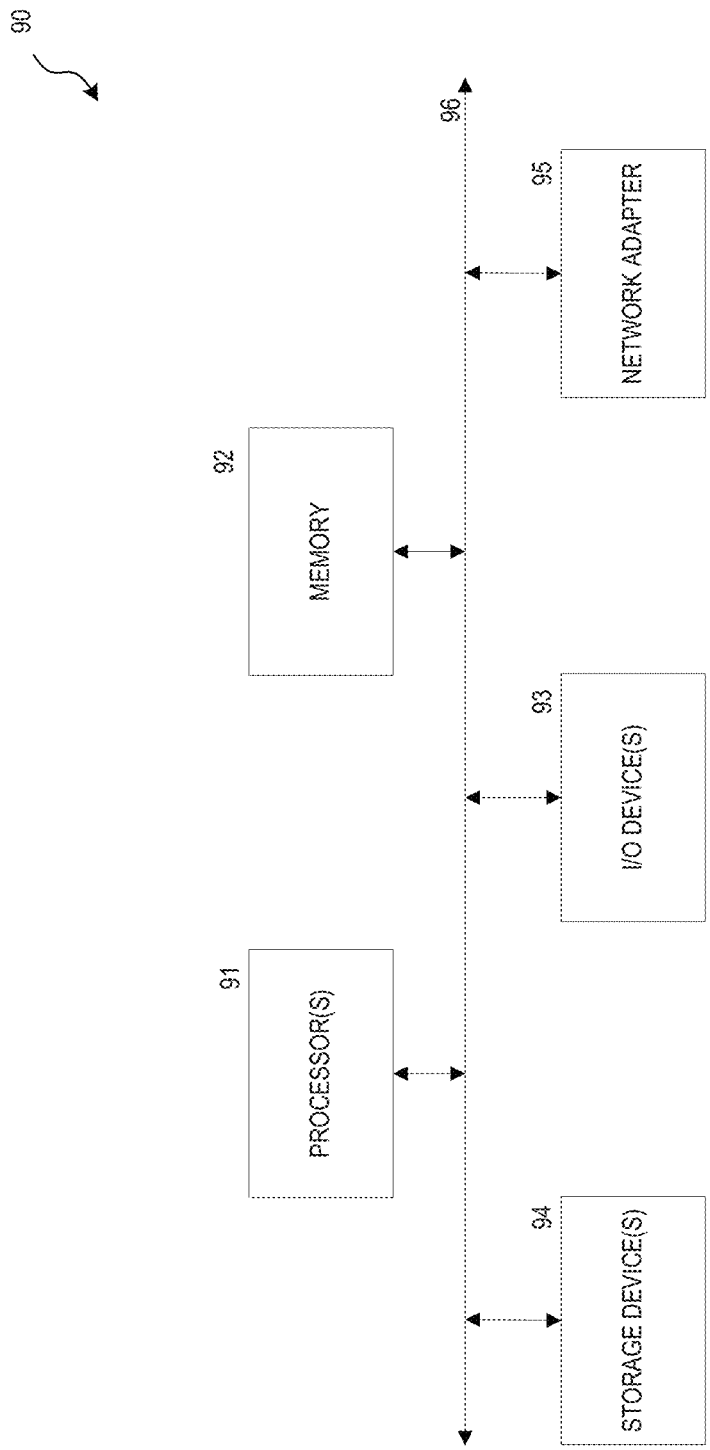
FIG. 17 is a block diagram of a computer operable to implement the disclosed technology according to some embodiments of the present disclosure.

FIG. 17 is a block diagram of a computer system as may be used to implement features of some of the embodiments. The computing system 90 may include one or more central processing units ("processors") 91, memory 92, input/output devices 93 (e.g., keyboard and pointing devices, display devices), storage devices 94 (e.g., disk drives), and network adapters 95 (e.g., network interfaces) that are connected to an interconnect 96. The interconnect 96 is illustrated as an abstraction that represents any one or more separate physical buses, point to point connections, or both connected by appropriate bridges, adapters, or controllers. The interconnect 96, therefore, may include, for example, a system bus, a peripheral component interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 92 and storage devices 94 are computer-readable storage media that may store instructions that implement at least portions of the various embodiments. In addition, the data structures and message structures may be stored or transmitted via a data transmission medium, such as a signal on a communications link. Various communications links may be used, such as the Internet, a local area network, a wide area network, or a point-to-point dial-up connection. Thus, computer readable media can include computer-readable storage media (e.g., "non-transitory" media) and computer-readable transmission media.

The instructions stored in memory 92 can be implemented as software and/or firmware to program the processor(s) 91 to carry out actions described above. In some embodiments, such software or firmware may be initially provided to the processing system by downloading it from a remote system through the computing system 700 (e.g., via network adapter 95).

The various embodiments introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Remarks

This disclosure solves problems associated with power budget fragmentation and improves power utilization by existing datacenters. The described techniques leverage power utilization patterns by servers for changing workloads. The disclosed solutions include a workload-aware server placement framework and dynamic power profile reshaping at runtime in a production environment. The results show that up to 20% or more of a datacenter's power budget in a production environment can be restored by applying the workload-aware server placement framework without needing to change the underlying power infrastructure of a datacenter. Further, up to 44% or more of energy slack reduction can be achieved and up to 8% or more of front-end throughput improvement can be achieved without significantly reducing the overall throughput of any HADOOP clusters.

The above description and drawings are illustrative and are not to be construed as limiting. Numerous specific details are described to provide a thorough understanding of the disclosure. However, in certain instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains.

The headings provided herein are for convenience only and do not necessarily affect the scope or meaning of the claimed embodiments. Further, The drawings have not necessarily been drawn to scale. For example, the dimensions of some of the elements in the figures may be expanded or reduced to help improve the understanding of the embodiments. Similarly, some components and/or operations may be separated into different blocks or combined into a single block for the purposes of discussion of some of the embodiments. Moreover, while the various embodiments are amenable to various modifications and alternative forms, specific embodiments have been shown by way of example in the drawings and are described in detail below. The intention, however, is not to limit the particular embodiments described. On the contrary, the embodiments are intended to cover all modifications, equivalents, and alternatives falling within the scope of the disclosed embodiments as defined by the appended claims.

What is claimed is:

1. A method performed by a computing device, the method comprising:
    determining a plurality of power utilization patterns of a plurality of servers of a computer system, wherein:
        the computer system comprises the plurality of servers and a plurality of power nodes in a hierarchical arrangement;
        each of the plurality of servers performs one or more of a plurality of workloads of the computer system;
        each of the plurality of power nodes has a maximum power capacity; and
        each of the plurality of servers draws power from one or more of the plurality of power nodes;
    calculating a plurality of asynchrony scores for the plurality of servers based on the plurality of power utilization patterns;
    clustering the plurality of servers into a plurality of clusters based on the plurality of asynchrony scores, wherein each cluster has servers that have synchronous utilization patterns; and reducing synchronous power utilization patterns within the computer system by reallocating, based on the clustering, the plurality of workloads amongst the plurality of servers.

2. The method of claim 1, wherein the plurality of power utilization patterns are extracted beginning at a current point in time and ending at a selected prior point in time.

3. The method of claim 1, wherein each asynchrony score is calculated as:

$$A = \frac{\sum_{j \in S_N} v_j}{\hat{P}}$$

where $S_N$ is a set of servers provisioned for a power node N, $v_j$ is a value of a peak power of a power utilization pattern of server j, and $\hat{P}$ is a peak power draw of an aggregated power utilization pattern of all servers in $S_N$.

4. The method of claim 1, further comprising, prior to clustering the plurality of servers:
estimating a high-dimensional asynchrony score space used to classify each server based on its asynchrony score.

5. The method of claim 1, wherein each server has only one asynchrony score.

6. The method of claim 1, wherein clustering the plurality of servers comprises: applying a k-means clustering technique to group the plurality of servers into clusters of synchronous servers.

7. The method of claim 1, wherein each of the plurality of workload is classified as one of a front-end workload, a database workload, or a big-data workload, and at least two of the plurality of workloads are classified differently.

8. The method of claim 1, wherein the plurality of workloads are reallocated in accordance with a placement policy to minimize the asynchrony score of each power node.

9. The method of claim 1, wherein workloads of the plurality of servers are reallocated from the plurality of clusters in a top-down manner to the hierarchical arrangement of the plurality of power nodes.

10. The method of claim 1, wherein reallocated the plurality of workloads comprises:
selecting a server from each of the plurality of clusters; and
placing a workload of each selected server into the hierarchical arrangement of the plurality of power nodes.

11. The method of claim 1, wherein reallocated the plurality of workloads comprises:
selecting a server from each of the plurality of clusters in a round-robin fashion; and
placing a workload of each selected server into the hierarchical arrangement of the plurality of power nodes.

12. The method of claim 1, further comprising:
setting a conversion threshold to a peak value of an aggregation of power utilization by a plurality of front-end servers of the plurality of servers based on the plurality of power utilization patterns; and
setting a scaling threshold to a value equal to the conversion threshold value minus a maximum power headroom of a plurality of big-data servers of the plurality of servers.

13. The method of claim 12, further comprising:
converting a disaggregated server to a front-end server when a total power consumption of the plurality of front-end servers is greater than or equal to the conversion threshold.

14. The method of claim 12, further comprising:
converting a disaggregated server to a big-data server when a total power consumption of the plurality of front-end servers is less than the conversion threshold.

15. The method of claim 12, further comprising:
throttling the plurality of big-data servers of the plurality of servers when a total power consumption of the plurality of front-end servers is greater than or equal to the scaling threshold.

16. The method of claim 12, further comprising:
boosting the plurality of big-data servers of the plurality of servers when a total power consumption of the plurality of front-end servers is less than the scaling threshold.

17. The method of claim 1, further comprising: shaping a power utilization profile based on a policy trained or retrained on a plurality of power utilization patterns extracted beginning at a current point in time and ending at a selected prior point in time.

18. The method of claim 12, further comprising:
dynamically reshaping the power utilization pattern of a power node.

19. A non-transitory computer-readable storage memory storing instructions that, when executed by a computing device, cause actions comprising:
determining a plurality of power utilization patterns of a plurality of servers of a computer system, wherein:
the computer system comprises the plurality of servers and a plurality of power nodes in a hierarchical arrangement;
each of the plurality of servers performs one or more of a plurality of workloads of the computer system;
each of the plurality of power nodes has a maximum power capacity; and each of the plurality of servers draws power from one or more of the plurality of power nodes;
calculating a plurality of asynchrony scores for the plurality of servers based on the plurality of power utilization patterns;
clustering the plurality of servers into a plurality of clusters based on the plurality of asynchrony scores, wherein each cluster has servers that have synchronous utilization patterns; and
reducing synchronous power utilization patterns within the computer system by reallocating, based on the clustering, the plurality of workloads amongst the plurality of servers.

20. A computing device comprising:
a processor; and
one or more memories including instructions executable by the processor causing the computing device to:
determine a plurality of power utilization patterns of a plurality of servers of a computer system, wherein:
the computer system comprises the plurality of servers and a plurality of power nodes in a hierarchical arrangement;
each of the plurality of servers performs one or more of a plurality of workloads of the computer system;
each of the plurality of power nodes has a maximum power capacity; and each of the plurality of servers draws power from one or more of the plurality of power nodes;

calculate a plurality of asynchrony scores for the plurality of servers based on the plurality of power utilization patterns;

cluster the plurality of servers into a plurality of clusters based on the plurality of asynchrony scores, wherein each cluster has servers that have synchronous utilization patterns; and reduce synchronous power utilization patterns within the computer system by reallocating, based on the clustering, the plurality of workloads amongst the plurality of servers.

* * * * *

UNITED STATES PATENT AND TRADEMARK OFFICE
CERTIFICATE OF CORRECTION

PATENT NO. : 10,528,115 B2
APPLICATION NO. : 15/709434
DATED : January 7, 2020
INVENTOR(S) : Qingyuan Deng et al.

It is certified that error appears in the above-identified patent and that said Letters Patent is hereby corrected as shown below:

In the Claims

In Column 21, Line 34, Claim 7, delete "workload" and insert -- workloads --, therefor.

Signed and Sealed this
Third Day of March, 2020

Andrei Iancu
*Director of the United States Patent and Trademark Office*